(12) United States Patent
Sato et al.

(10) Patent No.: US 11,509,602 B2
(45) Date of Patent: Nov. 22, 2022

(54) RESOURCE MANAGEMENT SERVER, CONTROL METHOD, AND NON-TRANSITORY STORAGE MEDIUM

(71) Applicant: SHARP KABUSHIKI KAISHA, Sakai (JP)

(72) Inventors: Kazuki Sato, Sakai (JP); Katsuyoshi Kondoh, Sakai (JP); Takayoshi Ohkohchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 113 days.

(21) Appl. No.: 16/945,008

(22) Filed: Jul. 31, 2020

(65) Prior Publication Data

US 2021/0036965 A1 Feb. 4, 2021

(30) Foreign Application Priority Data

Jul. 31, 2019 (JP) .............................. JP2019-141411

(51) Int. Cl.
*H04L 47/70* (2022.01)
*G06N 5/04* (2006.01)
*G06N 20/00* (2019.01)
*G06Q 10/06* (2012.01)

(52) U.S. Cl.
CPC ............. *H04L 47/821* (2013.01); *G06N 5/04* (2013.01); *G06N 20/00* (2019.01); *G06Q 10/0631* (2013.01)

(58) Field of Classification Search
CPC ...... G06N 5/04; G06N 20/00; G06Q 10/0631; G06Q 30/0601; G06Q 99/00; H04L 47/821; H04L 65/4015; H04L 65/403; H04L 67/10; G06F 16/2246; G06F 16/9574; G06F 3/04842; G06F 3/04883; G06F 9/5088; H04W 12/08
See application file for complete search history.

(56) References Cited

U.S. PATENT DOCUMENTS

| 8,767,593 | B1 * | 7/2014 | Allen | ........................... 370/260 |
| 11,068,136 | B1 * | 7/2021 | Koushik | .............. G06F 3/04842 |
| 2004/0107125 | A1 * | 6/2004 | Guheen | .................. G06Q 99/00 |
| | | | | 705/319 |
| 2010/0037151 | A1 * | 2/2010 | Ackerman | .......... H04L 65/4015 |
| | | | | 715/753 |
| 2010/0145801 | A1 * | 6/2010 | Chekuri | ............. G06Q 30/0601 |
| | | | | 705/14.51 |
| 2014/0344420 | A1 * | 11/2014 | Rjeili | ...................... H04L 67/10 |
| | | | | 709/220 |
| 2014/0362742 | A1 * | 12/2014 | Martinez | ............... H04L 65/403 |
| | | | | 370/262 |

(Continued)

FOREIGN PATENT DOCUMENTS

JP 2018-107484 A 7/2018
JP 2019-096233 A 6/2019

*Primary Examiner* — Le H Luu
(74) *Attorney, Agent, or Firm* — ScienBiziP, P.C.

(57) ABSTRACT

This resource management server includes a controller, a communicator that communicates with a license management server which manages a license, and a storage. The storage stores resource information. The controller acquires license information from the license management server via the communicator, and activates resources stored by the storage, starting from a highest priority resource, based on the license information.

12 Claims, 34 Drawing Sheets

(56) References Cited

U.S. PATENT DOCUMENTS

| | | | |
|---|---|---|---|
| 2016/0364821 A1* | 12/2016 | Dibble | G06F 16/2246 |
| 2018/0357395 A1* | 12/2018 | Papa | H04W 12/08 |
| 2019/0141494 A1* | 5/2019 | Gross | G06F 3/04883 |
| 2019/0320038 A1* | 10/2019 | Walsh | G06F 16/9574 |
| 2020/0314175 A1* | 10/2020 | Dailianas | G06F 9/5088 |

* cited by examiner

FIG. 3

| RESOURCE ID | ATTRIBUTE | | | RESOURCE STATE |
| --- | --- | --- | --- | --- |
| | CONFERENCE ROOM NAME | LOCATION | DEVICE | |
| 1 | A-Room | AAA BUILDING 12TH FLOOR | ELECTRONIC WHITEBOARD | ACTIVE |
| 2 | B-Room | AAA BUILDING 12TH FLOOR | ELECTRONIC WHITEBOARD SMART SPEAKER | ACTIVE |
| 3 | Room-111 | BBB BUILDING 2ND FLOOR | - | ACTIVE |
| 4 | Room-112 | BBB BUILDING 2ND FLOOR | - | INACTIVE |
| 5 | MeetingSpace-A | CCC BUILDING | SMART SPEAKER | ACTIVE |
| ⋮ | ⋮ | ⋮ | ⋮ | ⋮ |

FIG. 4A

| LICENSE ID | EXPIRATION DATE |
|---|---|
| L1 | 2020/6/3 |
| L2 | 2020/3/31 |
| L3 | 2019/12/31 |
| L4 | 2019/12/31 |
| L5 | 2020/1/31 |
| ⋮ | ⋮ |

FIG. 4B

| NUMBER OF LICENSES | EXPIRATION DATE |
|---|---|
| 5 | 2020/6/3 |

FIG. 24

| RESOURCE ID | DATE AND TIME USED | DEVICE USED | RESERVATION EXISTS? | NUMBER OF PARTICIPANTS | RESERVATION EXTENSION EXISTS? |
|---|---|---|---|---|---|
| 1 | JULY 1, 2019 9:00~10:00 | ELECTRONIC WHITEBOARD | YES | 5 PEOPLE | YES(15 MINUTES) |
| 1 | JULY 1, 2019 13:00~14:20 | ELECTRONIC WHITEBOARD | YES | 2 PEOPLE | NO |
| 3 | JULY 1, 2019 13:30~14:20 | - | NO | 3 PEOPLE | NO |
| 3 | JULY 2, 2019 10:00~11:15 | - | YES | 8 PEOPLE | YES(15 MINUTES) |
| 2 | JULY 2, 2019 11:00~11:45 | SMART SPEAKER | NO | 5 PEOPLE | NO |
| ⋮ | ⋮ | ⋮ | ⋮ | ⋮ | ⋮ |

FIG. 33

| RESOURCE ID | ATTRIBUTE | | | LICENSE ID |
|---|---|---|---|---|
| | CONFERENCE ROOM NAME | LOCATION | DEVICE | |
| 1 | A-Room | AAA BUILDING 12TH FLOOR | ELECTRONIC WHITEBOARD | L1 |
| 2 | B-Room | AAA BUILDING 12TH FLOOR | ELECTRONIC WHITEBOARD SMART SPEAKER | L3 |
| 3 | Room-111 | BBB BUILDING 2ND FLOOR | - | L2 |
| 4 | Room-112 | BBB BUILDING 2ND FLOOR | - | - |
| 5 | MeetingSpace-A | CCC BUILDING | SMART SPEAKER | L4 |
| ⋮ | ⋮ | ⋮ | ⋮ | ⋮ |

# RESOURCE MANAGEMENT SERVER, CONTROL METHOD, AND NON-TRANSITORY STORAGE MEDIUM

BACKGROUND OF THE INVENTION

Field of the Invention

The present invention relates to a resource management server and the like.

Description of the Background Art

In recent years, a subscription model is sometimes adopted as a usage agreement (license) model for apps (applications) and devices. In a subscription model agreement, a license is managed for each user of the app. Further, devices are managed such that, for example, a license (usage permission) is managed for the devices placed in each room.

As a technique for managing the devices placed in each room, for example, proposed is a technique in which a data server centrally manages the identification information relating to a plurality of connected information processing devices (for example, see Japanese Unexamined Patent Application Publication No. 2018-107484).

Problems to be Solved by the Invention

However, the technique disclosed in Japanese Unexamined Patent Application Publication No. 2018-107484 is a technique for centrally managing the identification information of a plurality of connected information processing devices. It is not a technique for managing device licenses. Therefore, if there is a change in the number of devices, an administrator managing the licenses needs to change the content of the agreement each time. Specifically, it is necessary for the administrator to appropriately activate resources, such that when a device is newly installed, the installed device is granted with a license, and when a device is removed, the removed device is no longer provided with the license. Therefore, there is a problem that management of the licenses is inefficient for the administrator. Furthermore, allocation of the licenses is time-consuming, and it takes time before a resource becomes usable. Even when resources are registered simultaneously, it is necessary for the administrator to visually check the resources to be allocated with licenses, and then allocate the licenses.

In view of the problems described above, the present invention has an object of providing a resource management server and the like, capable of activating a resource based on license information.

SUMMARY OF THE INVENTION

Means for Solving the Problem

In order to solve the problems described above, a resource management server of the present invention includes: a controller; a communicator that communicates with a license management server which manages a license; and a storage; wherein the storage stores resource information, and the controller acquires license information from the license management server via the communicator, and activates resources stored by the storage, starting from a highest priority resource, based on the license information.

A control method of the present invention is a control method for a resource management server including a controller, a communicator that communicates with a license management server which manages a license, and a storage that stores resource information, the control method including: acquiring license information from the license management server via the communicator; and activating resources stored by the storage, starting from a highest priority resource, based on the license information.

A non-transitory storage medium of the present invention is a non-transitory storage medium storing a program that is readable by a computer of a resource management server including a controller, a communicator that communicates with a license management server which manages a license, and a storage that stores resource information, wherein the program causes the computer to: acquire license information from the license management server via the communicator; and activate resources stored by the storage, starting from a highest priority resource, based on the license information.

Effects of the Invention

According to the present invention, it is possible to activate a resource based on license information.

BRIEF DESCRIPTION OF THE DRAWINGS

FIG. 3 is a diagram showing a data configuration example of resource information according to the first embodiment.

FIGS. 4A and 4B are diagrams showing a data configuration example of license information according to the first embodiment.

FIG. 24 is a diagram showing a data configuration example of usage history information according to the third embodiment.

FIG. 33 is a diagram showing a data configuration example of resource information according to a seventh embodiment.

DESCRIPTION OF THE PREFERRED EMBODIMENTS

Hereinafter, embodiments of the present invention will be described with reference to the drawings. In the present embodiment, a resource management system including a resource management server to which the present embodiment is applied will be described as an example.

1. First Embodiment 1.1 Overall Configuration

Figure 1:
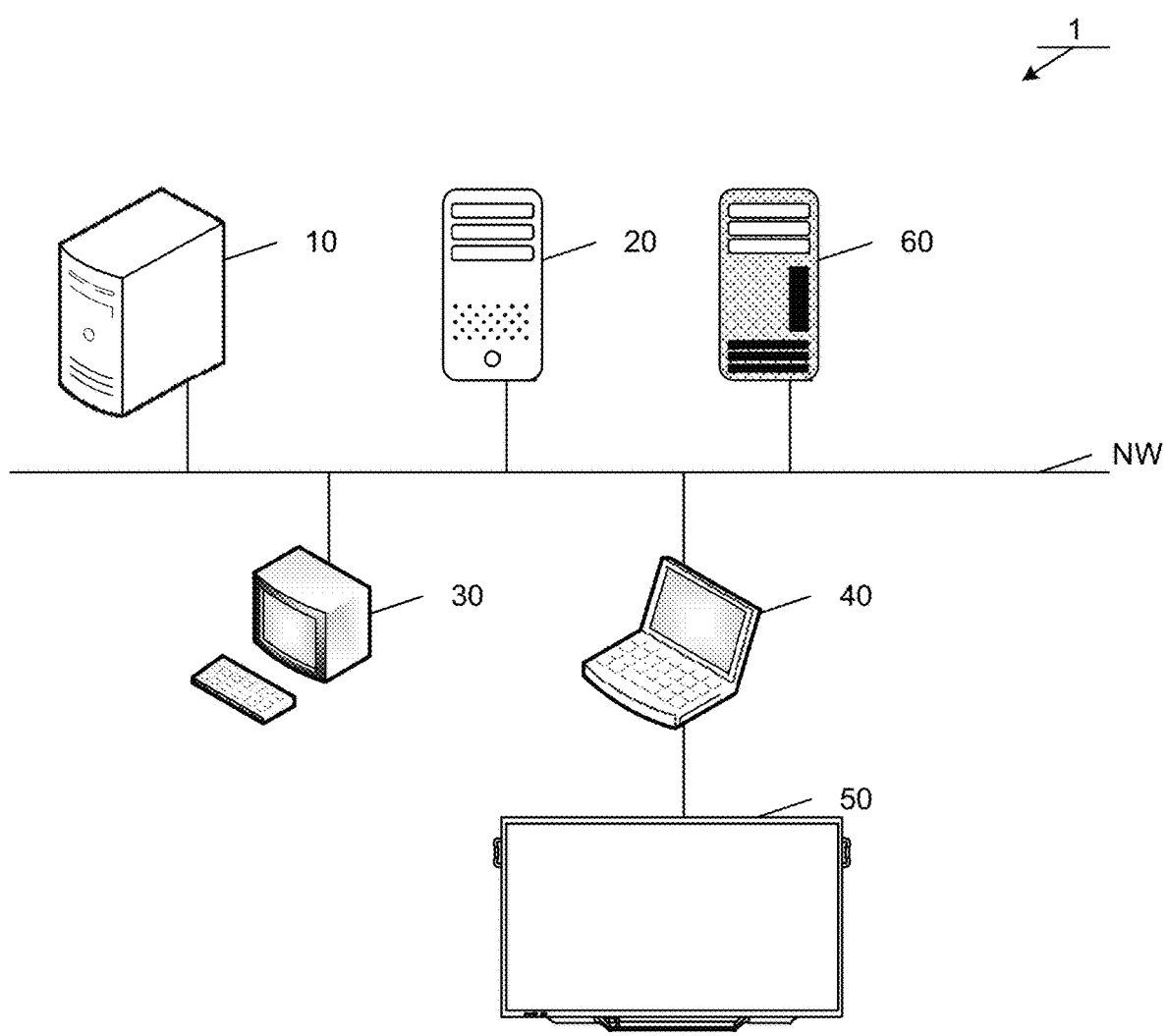
FIG. 1 is a diagram for describing an overall configuration of a resource management system according to a first embodiment.

FIG. 1 is a diagram showing an overall configuration of a resource management system (hereinafter simply referred to as "system 1") according to the present embodiment. As shown in FIG. 1, in the system 1, a resource management server 10, a license management server 20, a management terminal device 30, and a conference management server 60 are connected via a network NW. The network NW is, for example, a local area network (LAN). The network NW may also be a network such as the Internet.

The system 1 is a system that manages resources. Here, a resource is the name given to a unit managed by the system 1, and conceptually includes, for example, hardware, software, and users managed by the system 1. Hereinafter, the present embodiment will be described using a "conference room" as an example of a resource. A "conference room" typically refers to the concept of a location in which conferences, appointments, and meetings are held (a conference space). Here, the resource may also refer to a terminal device inside the conference room, or a terminal device used by the user hosting the conference. Furthermore, a conference room represents a unit location in which a conference is held. In addition to general conference rooms, this includes not only facilities such as classrooms and meeting spaces where a plurality of people gathers, but also spaces such as the homes of remote workers.

Moreover, the system 1 manages one or more resources. For example, the system 1 manages resources for each administrator, business operator, tenant, or manager. For example, when a certain tenant has five conference rooms, the system 1 manages five resources.

The resource management server 10 is an information processing device that manages the resources. For example, the resource management server 10 is configured by a computer such as a server.

The license management server 20 is an information processing device that manages the usage agreements (licenses) of the resources. For example, the license management server 20 is configured by a computer such as a server.

The management terminal device 30 is a device used by the user to manage resources/licenses. For example, the management terminal device 30 is configured by an information processing device such as a personal computer (PC).

Furthermore, a conference terminal device 40 used for holding a conference is connected to the system 1 via the conference room, which serves as a resource in the present embodiment. The conference terminal device 40 may be installed in advance as a terminal device in the conference room, or may be installed as a result of the user bringing in a portable terminal device (such as a laptop computer or a tablet).

The conference terminal device 40 has a video output terminal such as High-Definition Multimedia Interface (HDMI, registered trademark). Further, as shown in FIG. 1, the conference terminal device 40 may be connectable to a device such as a display device 50 having a video input terminal. Moreover, the conference terminal device 40 may be connectable via the network NW to a conference management server 60 that realizes a conference reservation function and an event notification function.

The display device 50 is not limited to simply displaying information, and may be, for example, an electronic whiteboard (IWB: interactive whiteboard) including a touch panel capable of touch inputs. Furthermore, the display device 50 is also assumed to include, for example, a configuration that combines a projection device capable of projecting on a wall or a desk and a detection device capable of detecting gestures.

The conference management server 60 is a server that provides a conference service. For example, the user makes a reservation to host a conference in the conference management server 60. The conference management server 60 stores files such as documents and various information such as text and emails in association with the conference. For example, as the conference service, the method disclosed in Japanese Unexamined Patent Application Publication No. 2019-96233 (Title of the Invention: Terminal Device, Conference Management System, Program, and Conference Management Method; Date Filed: Nov. 27, 2017) can be used. In addition, general services such as TeleOffice (registered trademark), Microsoft Teams, and Office 365 can be used.

Note that the configuration described above is an example, and the configuration may be changed as appropriate. For example, when a predetermined terminal device is not used when a resource is used by the user, the system 1 does not have to include a terminal device such as the conference terminal device 40. Furthermore, the resource management server 10 and the license management server 20 may be realized by the same device. In addition, the management terminal device 30 and the conference terminal device 40 may be configured by the same device. Moreover, a plurality of management terminal devices 30 and conference terminal devices 40 may be connected to the network NW.

The system 1 may manage the resources and licenses for a plurality of tenants. However, in the present embodiment, the description will assume that the resources and licenses are managed for a single tenant.

1.2 Functional Configuration 1.2.1 Resource Management Server

Figure 2:
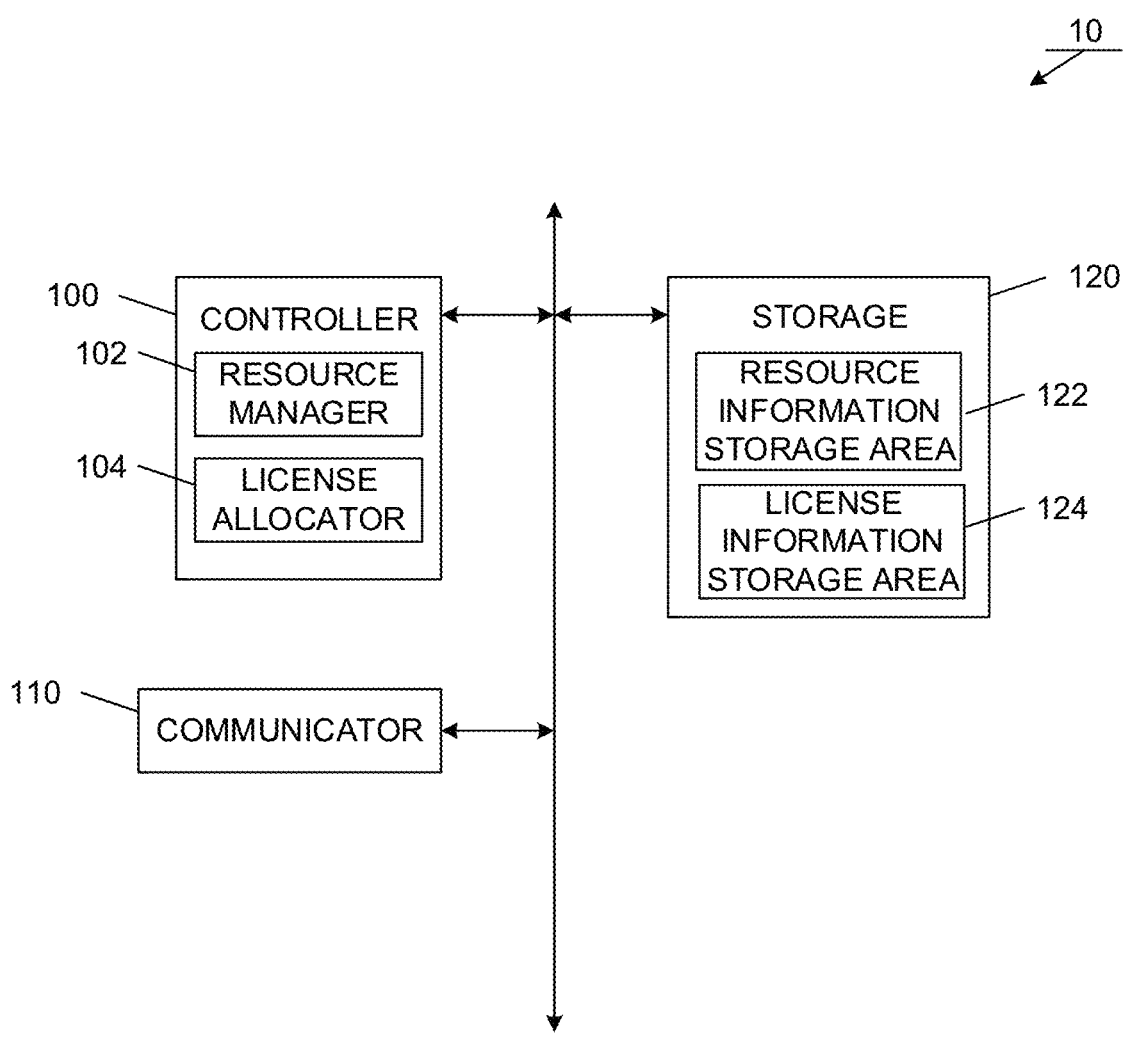
FIG. 2 is a functional block diagram for describing a functional configuration of a resource management server according to the first embodiment.

Next, the configuration of each device included in the system 1 will be described with reference to the drawings. FIG. 2 is a diagram for describing a functional configuration of the resource management server 10. The resource management server 10 includes a controller 100, a communicator 110, and a storage 120.

The controller 100 is a functional unit for controlling the resource management server 10 as a whole. The controller 100 realizes various functions by reading and executing various programs, and is constituted by one or more computation devices (for example, a central processing unit, or CPU).

Furthermore, the controller 100 realizes the functions of a resource manager 102 and a license allocator 104 by reading and executing a program stored in the storage 120.

The resource manager 102 manages resources. That is to say, the resource manager 102 is capable of adding and removing resources to be managed. The resource manager 102 stores information relating to the resources being managed as resource information in a resource information storage area 122.

The license allocator 104 allocates licenses with respect to the resources managed by the resource management server 10 based on information relating to the licenses (hereinafter, referred to as "license information") acquired from the license management server 20. When the license allocator 104 allocates a license to a resource, the resource is activated. When the resource is activated (Active), the user is capable of using the resource. On the other hand, when the resource is not activated (Inactive), the user is unable to use the resource. Note that a resource in an activated state is referred to as an active resource, and a resource in an inactive state is referred to as an inactive resource.

The communicator 110 communicates with other devices such as the license management server 20, the management terminal device 30, and the conference management server 60 via the network NW. The network NW may be connected by wired connections or wireless connections. For example, the communicator 110 is constituted by a communication module (data transceiver) such as a network interface card (NIC) used by a wired/wireless LAN.

The storage 120 is a functional unit that stores various programs and various data required for operation of the resource management server 10. For example, the storage 120 is constituted by a storage device such as a solid state drive (SSD), which is a semiconductor memory, or a hard disk drive (HDD), which is a magnetic disk.

Furthermore, in the storage 120, a resource information storage area 122 and a license information storage area 124 are provided as storage areas.

The resource information storage area 122 is an area that stores information relating to resources (resource information). For example, as shown in FIG. 3, the resource information storage area 122 stores as resource information: a resource ID (for example, "1") that identifies a resource; a conference room name (for example, "A-Room") as the name of the conference room, which is an example of a resource; the location of the conference room (for example, "AAA building 12th floor"); the device installed in the conference room (for example, "display device"); and the resource state (for example, "active"), which indicates the state of the resource.

Of the resource information shown in FIG. 3, the conference room name, the location, and the device are attributes of the resource, which is a conference room. Therefore, information other than the information mentioned above (for example, contact information, available times, and detailed device information) may be stored as resource information. If resources other than conference rooms (such as software, devices, or locations) are managed by the resource management server 10, attributes corresponding to the managed resources may be stored as resource information.

The license information storage area 124 is an area for storing license information. For example, the license allocator 104 acquires license information from the license management server 20. The license information storage area 124 stores one of the following types of information.

(1) License information for each resource whose resource state can be activated. For example, as shown in FIG. 4A, the license information in this case is identification information such as a license ID, a serial number, or an authentication number. A license expiration date or the like may also be included. For example, if licenses are required for five resources, as shown in FIG. 4A, the license information storage area 124 stores five sets of license information with different identification information.

(2) License information indicating the number of licenses that can activate the resource. For example, shown in FIG. 4B is the number (number of licenses) allocated to the resource. A license expiration date or the like may also be included. For example, if licenses are required for five resources, as shown in FIG. 4B, the license information storage area 124 stores information indicating that there are five licenses (that the number of licenses is five).

1.2.2 License Management Server

Figure 5:
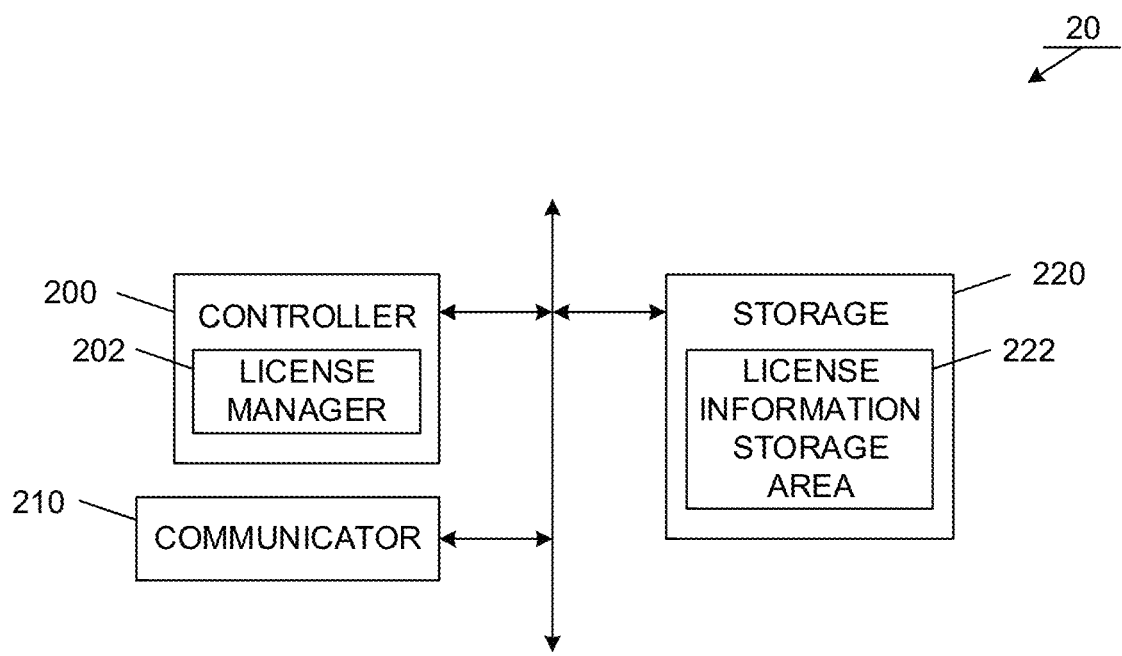
FIG. 5 is a functional block diagram for describing a functional configuration of a license management server according to the first embodiment.

FIG. 5 is a diagram for describing a functional configuration of the license management server 20. The license management server 20 includes a controller 200, a communicator 210, and a storage 220.

The controller 200 is a functional unit for controlling the license management server 20 as a whole. The controller 200 realizes various functions by reading and executing various programs, and is constituted by one or more computation devices (for example, a CPU).

Furthermore, the controller 200 realizes the functions of a license manager 202 by reading and executing a program stored in the storage 220.

The license manager 202 manages the licenses entered into by a tenant. For example, when a business operator such as a tenant, or an administrator or the like enters into an agreement, the license manager 202 records new license information or increases the number of licenses. Furthermore, when the expiration date lapses or the agreement is canceled by a business operator such as a tenant, or an administrator or the like, the license manager 202 removes the license information, or decreases the number of licenses. Moreover, the license manager 202 may update the expiration date of the licenses.

The communicator 210 is a functional unit for communicating with other devices such as the resource management server 10 via the network NW. The network NW may be connected by wired connections or wireless connections. For example, the communicator 210 is constituted by a communication module (data transceiver) such as an NIC used by a wired/wireless LAN.

The storage 220 is a functional unit that stores various programs and various data required for operation of the license management server 20. For example, the storage 220 is constituted by a storage device such as an SSD, which is a semiconductor memory, or an HDD, which is a magnetic disk.

Furthermore, a license information storage area 222 is provided in the storage 220. The license information storage area 222 stores the license information managed by the license manager 202.

1.2.3 Management Terminal Device

Figure 6:
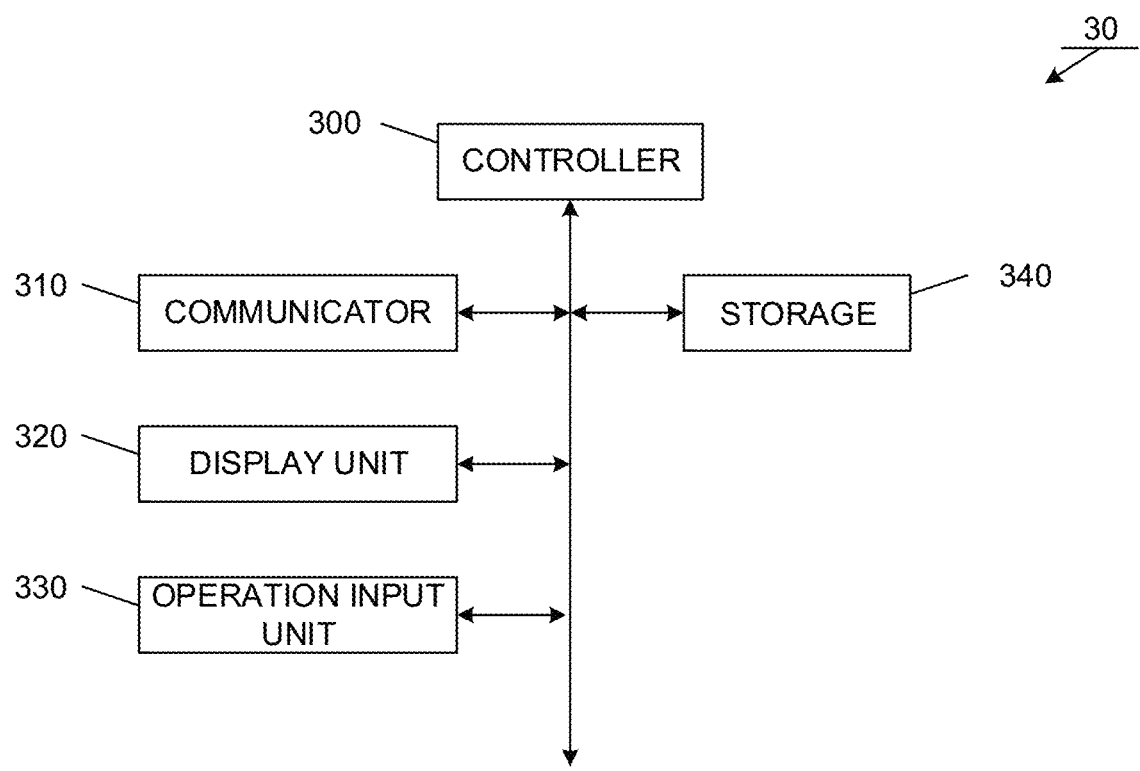
FIG. 6 is a functional block diagram for describing a functional configuration of a management terminal device according to the first embodiment.

FIG. 6 is a diagram for describing a functional configuration of the management terminal device 30. The management terminal device 30 includes a controller 300, a communicator 310, a display unit 320, an operation input unit 330, and a storage 340.

The controller 300 is a functional unit for controlling the management terminal device 30 as a whole. The controller 300 realizes various functions by reading and executing various programs, and is constituted by one or more computation devices (for example, a CPU).

The communicator 310 is a functional unit for communicating with other devices via the network NW. The network NW may be connected by wired connections or wireless connections. For example, the communicator 310 is constituted by a communication module (data transceiver) such as an NIC used by a wired/wireless LAN.

The display unit 320 is a functional unit for displaying various information. For example, the display unit 320 is constituted by a display device such as a liquid crystal display (LED) or an organic light-emitting diode (OLED) display.

The operation input unit 330 is a functional unit that accepts operation inputs from the user. The operation input unit 330 is configured by an external input device such as a keyboard or a mouse.

The storage 340 is a functional unit that stores various programs and various data required for operation of the management terminal device 30. For example, the storage 340 is constituted by a storage device such as an SSD, which is a semiconductor memory, or an HDD, which is a magnetic disk.

1.2.4 Conference Terminal Device

Figure 7:
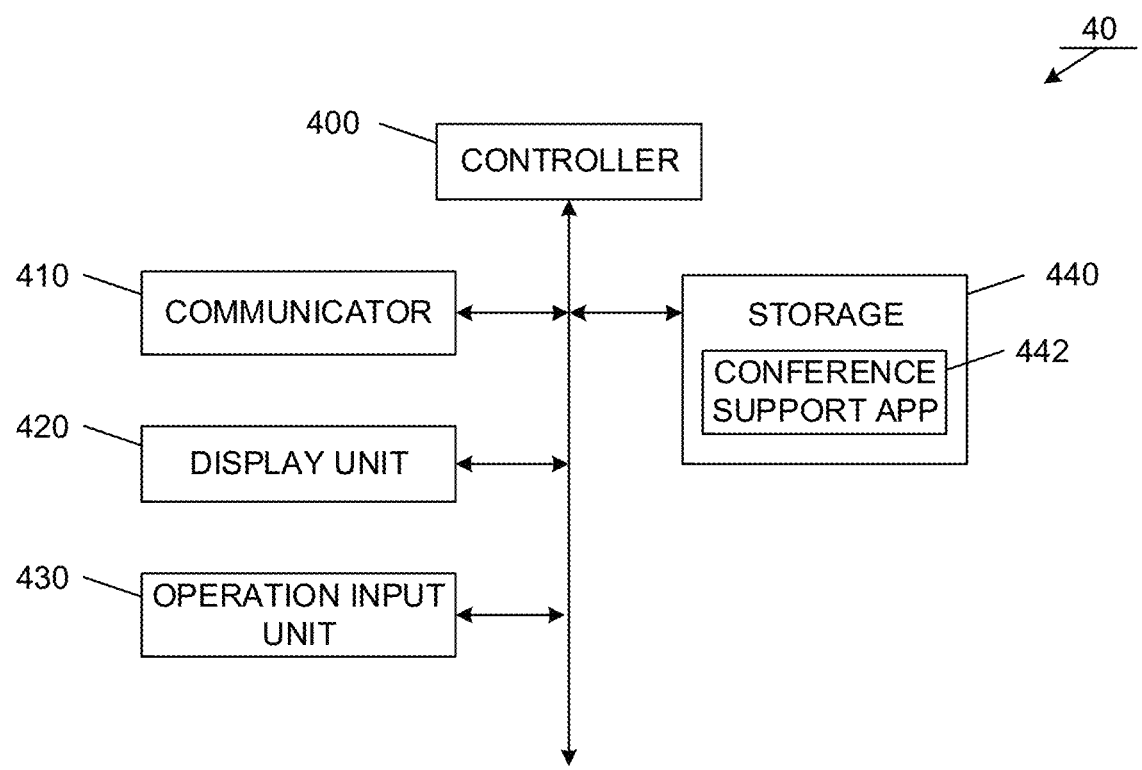
FIG. 7 is a functional block diagram for describing a functional configuration of a conference terminal device according to the first embodiment.

FIG. 7 is a functional block diagram for describing a functional configuration of the conference terminal device 40. The conference terminal device 40 includes a controller 400, a communicator 410, a display unit 420, an operation input unit 430, and a storage 440.

The controller 400 is a functional unit for controlling the conference terminal device 40 as a whole. The controller 400 realizes various functions by reading and executing various programs, and is constituted by one or more computation devices (for example, a CPU).

The communicator 410 is a functional unit for communicating with other devices such as the resource management server 10 and the conference management server 60 via the network NW. The network NW may be connected by wired connections or wireless connections. For example, the communicator 410 is constituted by a communication module such as an NIC used by a wired/wireless LAN.

The display unit 420 is a functional unit for displaying various information. For example, the display unit 420 is constituted by a display device such as an LCD or an OLED. The operation input unit 430 is a functional unit that accepts operation inputs from the user. The operation input unit 430 is configured by an external input device such as a keyboard or a mouse. The display unit 420 and the operation input unit 430 may be integrally configured as a touch panel.

The storage 440 is a functional unit that stores various programs and various data required for operation of the conference terminal device 40. For example, the storage 440 is constituted by a storage device such as an SSD, which is a semiconductor memory, or an HDD, which is a magnetic disk.

The storage 440 stores a conference support app 442, which is an application that assists users holding a conference. The controller 400 reads and executes the conference support app 442 and realizes conference support processing. The details of the conference support processing will be described later.

1.3 Processing Flow 1.3.1 Resource Management Server

Figure 8:
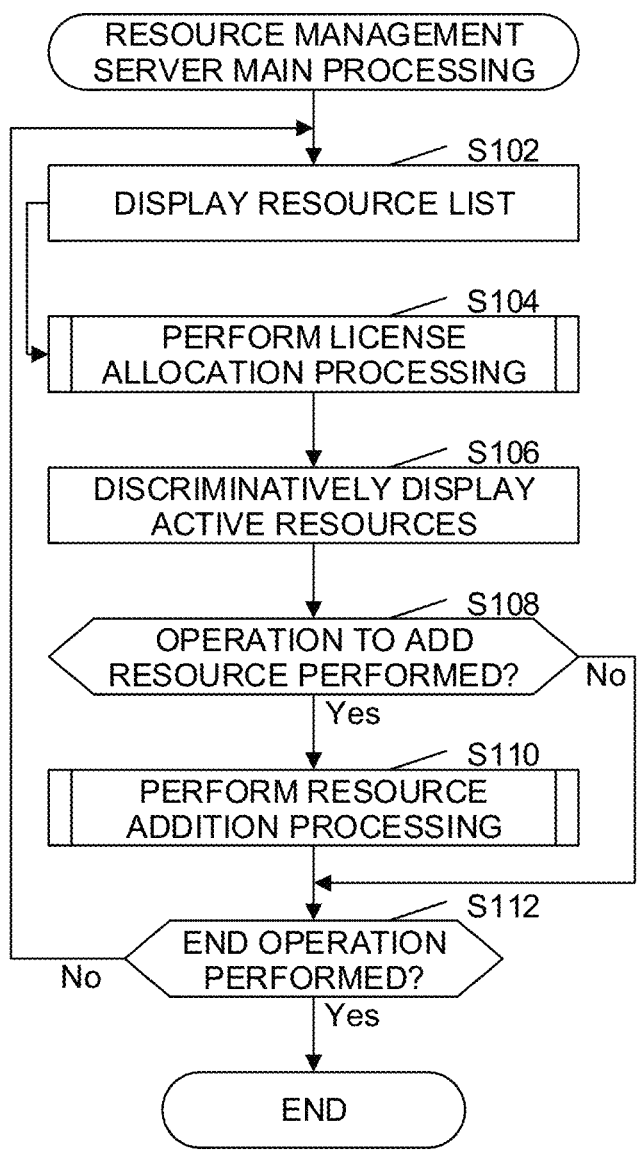
FIG. 8 is a flow diagram for describing the flow of main processing in the resource management server according to the first embodiment.

Next, the processing of the resource management server 10 in the present embodiment will be described. First, the main processing executed as a result of the controller 100 of the resource management server 10 reading and executing a program from the storage 120 will be described with reference to FIG. 8.

The controller 100 firstly performs control that displays the resources in a list (step S102). For example, the controller 100 reads resource information from the resource information storage area 122, and arranges the resource information in a predetermined order. Then, the controller 100 transmits the resource information which has been arranged in a predetermined order to the management terminal device 30. The management terminal device 30 displays, based on the received resource information, resource attributes such as the names of the resources (conference room names in the present embodiment) on the display unit 320.

The controller 100 may arrange the resource information in order of the resource ID, in order based on a resource attribute (for example, in order based on the names of the resources (the conference room name in the present embodiment) or in order of the number or types of devices), or in the order in which the resources were added. The order in which the resource information is arranged may be set in advance, or may be specified by the user operating the management terminal device 30. Furthermore, the user may select whether the order in which the resource information is arranged is in ascending order or descending order.

Next, the license allocator 104 executes license allocation processing (step S104). In the present embodiment, the license allocator 104 allocates licenses from the resource which is highest in the arrangement order of the resources in the list when displayed, and then activates the resources. That is to say, in the present embodiment, the priority is set by the order in which the controller 100 displays the resources in the list. The license allocation processing will be described with reference to FIG. 9.

The license allocator 104 firstly reads the resource information stored in the resource information storage area 122, and acquires a resource list (step S122). The resource list may include the resource information for each resource as is, or may include only the resource ID.

Next, the license allocator 104 acquires license information from the license management server 20 via the communicator 110 (step S124). The license allocator 104 stores the received license information in the license information storage area 124.

Then, the license allocator 104 rearranges the resource list acquired in step S122 based on the display order of the resources whose list was controlled to display in step S102 (step S126). As a result, the license allocator 104 sets priorities with respect to the resources based on the display order.

Next, the license allocator 104 extracts the first resource from the rearranged resource list, that is to say, the resource with the highest priority (step S128).

Then, the license allocator 104 acquires the number of licenses that can be allocated to the resources based on the license information stored in the license information storage area 124 (step S130). For example, if the license information storage area 124 stores, as shown in FIG. 4A, license information for each resource, which is capable of activating a resource, the license allocator 104 acquires the number of licenses by counting the number of sets of stored license information. Further, if the license information storage area 124 stores the number of licenses as shown in FIG. 4B, the license allocator 104 acquires the number of licenses by reading the stored license information.

Next, the license allocator 104 subtracts 1 from the number of licenses, and determines whether or not the number of licenses is 0 or more (step S132→step S134). If the number of licenses is 0 or more, the license allocator 104 performs processing that activates the extracted resource (step S134:Yes→step S136). The processing that activates the resource is processing which reads the resource information of the resource to be activated from the resource information storage area 122, sets the resource state to "active", and stores the resource state.

Next, the license allocator 104 extracts the next resource from the resource list that was rearranged in step S126, that is to say, the resource with the next highest priority after the currently extracted resource (step S138).

Then, returning to step S132, the license allocator 104 subtracts 1 from the number of licenses, and determines whether or not the number of licenses is 0 or more (step S132→step S134). The license allocator 104 ends the license allocation processing when the number of licenses becomes less than 0 (step S134:No).

Note that, if the license allocator 104 executes license allocation processing when active resources already exist, a newly activated resource can sometimes result in addition to the active resources. As a result, the number of active resources may exceed the number of licenses. In order to prevent the number of active resources from exceeding the number of licenses, the license allocator 104 may, for example, deactivate all resources at the start of resource allocation processing. Alternatively, the license allocator 104 may perform processing that deactivates all resources except for the resources that were activated in step S136. More specifically, the processing that deactivates the resource is processing which reads from the resource information storage area 122 corresponding to the resource to be deactivated, sets the resource state to "inactive", and stores the resource state.

Returning to FIG. 8, the controller 100 reads resource information from the resource information storage area 122, and performs control that discriminatively displays the active resources (step S106). For example, the controller 100 reads resource information from the resource information storage area 122, and transmits the resource IDs of the active resources to the management terminal device 30. Of the resource information displayed in the list, the controller 300 of the management terminal device 30 changes the background color of the resource information corresponding to the resource IDs received from the resource management server 10. As a result, the controller 300 of the management terminal device 30 is capable of displaying active resources such that they are distinguished from inactive resources. Note that the controller 300 of the management terminal device 30 may display, in the surroundings of the position in which the resource information is displayed, an icon or text that indicates whether or not the resource is active. Furthermore, the controller 300 may gray out inactive resources to make the active resources stand out.

Figure 10:
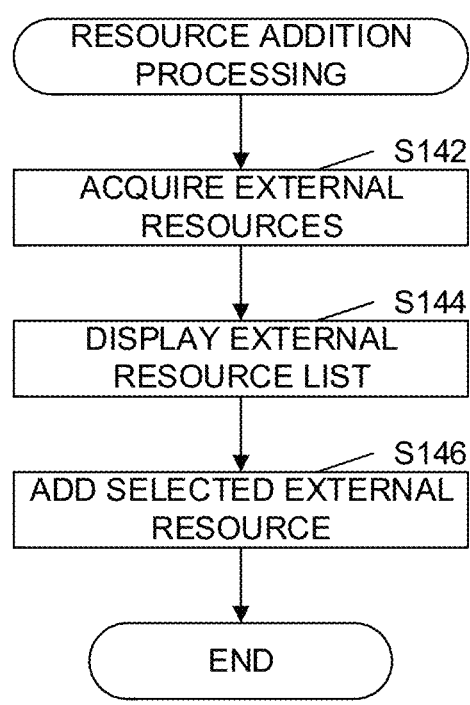
FIG. 10 is a flow diagram for describing the flow of resource addition processing according to the first embodiment.

Next, when the controller 100 determines that an operation to add resources has been performed by the user, it executes resource addition processing (step S108; Yes→step S110). The resource addition processing will be described with reference to FIG. 10.

The resource manager 102 firstly acquires information relating to addable resources (step S142), and displays a list of the acquired addable resources (step S144). Then, the resource manager 102 stores in the resource information storage area 122 the resources that were selected from among the resources displayed in the list (step S146).

Here, the addable resources may be applied by an external service or may be input by the user.

Returning to FIG. 8, the controller 100 determines whether or not an end operation has been performed by the user, and ends the main processing if an end operation has been performed (step S112; Yes). On the other hand, if an end operation has not been performed, the process returns to step S102 (step S112; No→step S102). An end operation refers to, for example, an operation that closes a web browser, displays another page, or closes an application for managing resources.

As a result of executing the processing described above, the controller 100 adds resources, and based on the display order of the resources, sets the highest priority from the top of the display order. This enables resources equivalent to the number of licenses to be activated from the highest priority resource.

1.3.2 Conference Terminal Device

Figure 11:
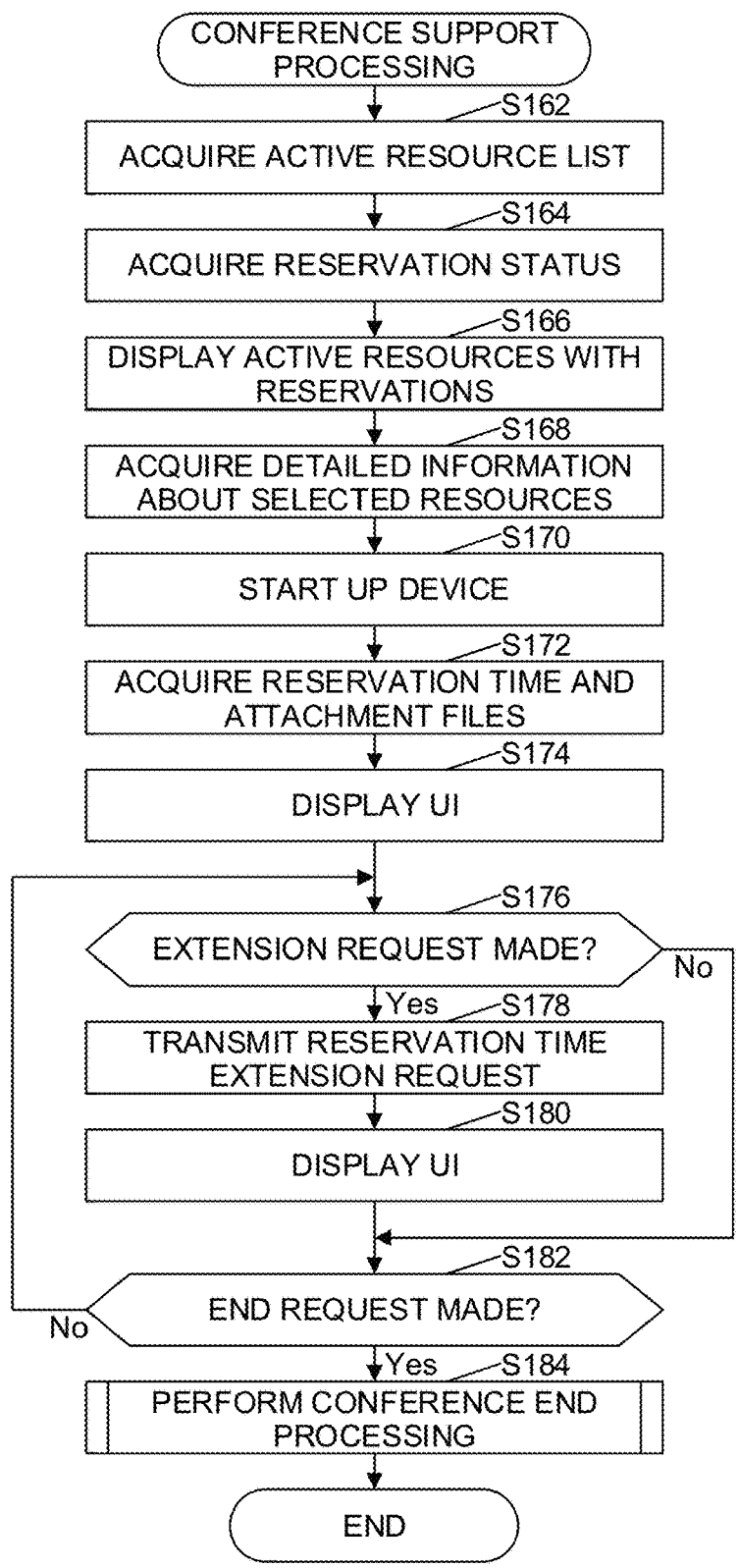
FIG. 11 is a flow diagram for describing the flow of conference support processing in the conference terminal device according to the first embodiment.

Next, the conference support processing executed as a result of the controller 400 of the conference terminal device 40 reading and executing a conference support app 442 from the storage 440 will be described with reference to FIG. 11.

The controller 400 firstly acquires a resource list of the active resources from the resource management server 10 (step S162). The resource list includes, for example, information including resource IDs and conference room names. The controller 400 stores the acquired resource list in the storage 440.

Then, the controller 400 acquires the reservation status of the active resources (conference rooms) from the conference management server 60 (step S164). For example, the controller 400 acquires, as the reservation status, information such the resource ID, which specifies the conference room that has been reserved for use, and the reservation time of the conference.

Next, the controller 400 compares the resource list stored in the storage 440 with the reservation status acquired in step S164 based on the resource IDs, and displays on the display unit 420 the active resources which have a reservation (step S166). Furthermore, if a resource is selected by the user, the controller 400 acquires detailed information about the selected resource from the resource management server 10 and performs device start-up (step S168→step S170).

Then, the controller 400 acquires, from the conference management server 60, the conference reservation time and files associated with the conference from the information relating to the conference to be held using the resource (conference room) selected by the user (step S172). Further, the controller 400 displays a user interface (UI) which includes text that indicates the reservation time and shortcuts for displaying the files (step S174).

The UI displayed by the controller 400 may include an extension button for extending the reservation time. If the extension button is selected by the user, the controller 400 transmits a reservation time extension request to the conference management server 60 (step S176; Yes→step S178). Furthermore, when the controller 400 acquires information relating to the extension of the reservation time from the conference management server 60 (for example, whether or not the extension is possible, and the end time if the reservation is extended), it displays a UI based on the acquired information (step S180).

Next, when a conference end request is made, the controller 400 executes conference end processing (step S182; Yes→step S184). A conference end request is made as a result of the user selecting, for example, a conference end button included in the UI. Moreover, conference end processing is processing which makes an end request to the device and transmits log information (usage history information) relating to the usage record of the conference room serving as the resource to a log server or the like. If a conference end request is not made, the process returns to step S176 (step S182; No→step S176).

1.4 Operation Example

An operation example of the present embodiment will be described. First, an example of screens displayed on the display unit 320 when the user adds a resource will be described with reference to FIG. 12 to FIG. 15. In the description of the operation example, the number of licenses is assumed to be four.

Figure 12:
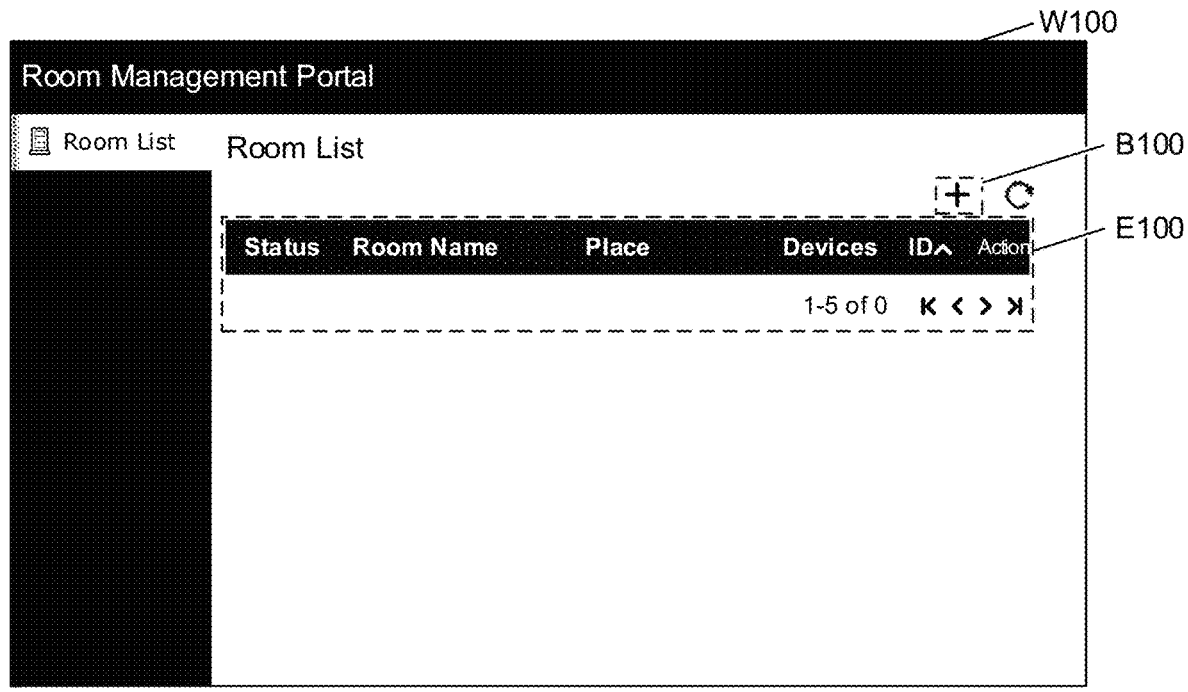
FIG. 12 is a diagram showing an operation example according to the first embodiment.

FIG. 12 is an example of a display screen W100 displayed on the display unit 320 when the user uses the management terminal device 30 to connect to the resource management server 10. The display screen W100 includes an area E100 that displays a resource list, and a button B100 to add a resource. FIG. 12 represents a case where there are no managed resources. Therefore, resource information is not displayed in the area E100.

Figure 13:
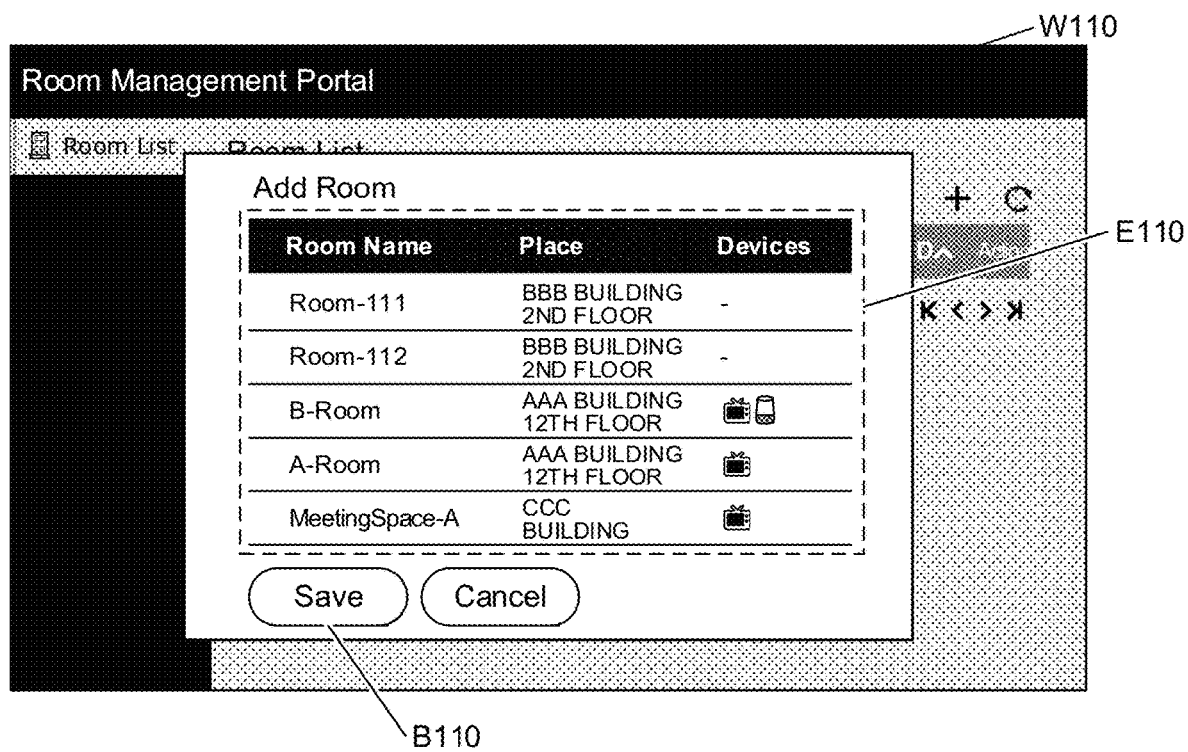
FIG. 13 is a diagram showing an operation example according to the first embodiment.

FIG. 13 is an example of a display screen W110 displayed on the display unit 320 when the user selects the button B100 on the display screen W100. The display screen W110 includes an area E110 that displays a list of information relating to addable resources (external resources) acquired from an external service. As shown in FIG. 13, for example, the area E110 may be included inside a popup window. The user selects the desired external resources to be added from the area E110, and selects a button B110 for adding the selected external resources. As a result, the user is capable of adding resources.

Figure 14:
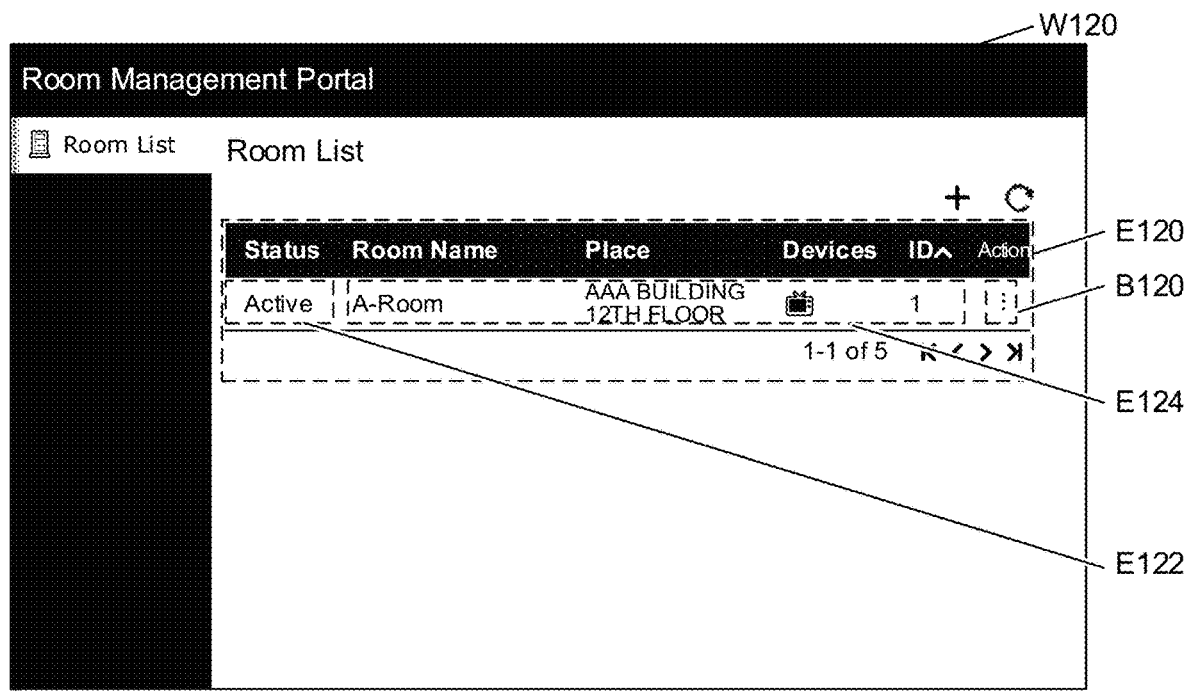
FIG. 14 is a diagram showing an operation example according to the first embodiment.

FIG. 14 is an example of a display screen W120 displayed on the display unit 320 when the user selects the button B110 on the display screen W110. The area E120, which displays a resource list on the display screen W120, displays information relating to the external resources added via the display screen W110 as resource information of resources that are being managed. FIG. 14 shows a case where a resource with the conference room name "A-Room" has been added.

The area E120 includes, for example, an area E122 that indicates whether or not a resource is active, an area E124 that displays resource information, and a button B120 that displays a menu for selecting an operation to be performed with respect to the resource (such as deleting the resource). In the example of FIG. 14, the area E122 displays the text "Active", which indicates that the resource is active. Furthermore, in the example of FIG. 14, the area E124 displays the conference room name, the location, the device, and the resource ID included in the resource information. It also indicates the device type with an icon.

Here, the number of licenses is four. Because this is greater than the number resource information displayed in the resource list, which is one, all resources are active. Therefore, because the resource added on the display screen W110 is active, the resource information of "A-Room" is discriminatively displayed.

Figure 15:
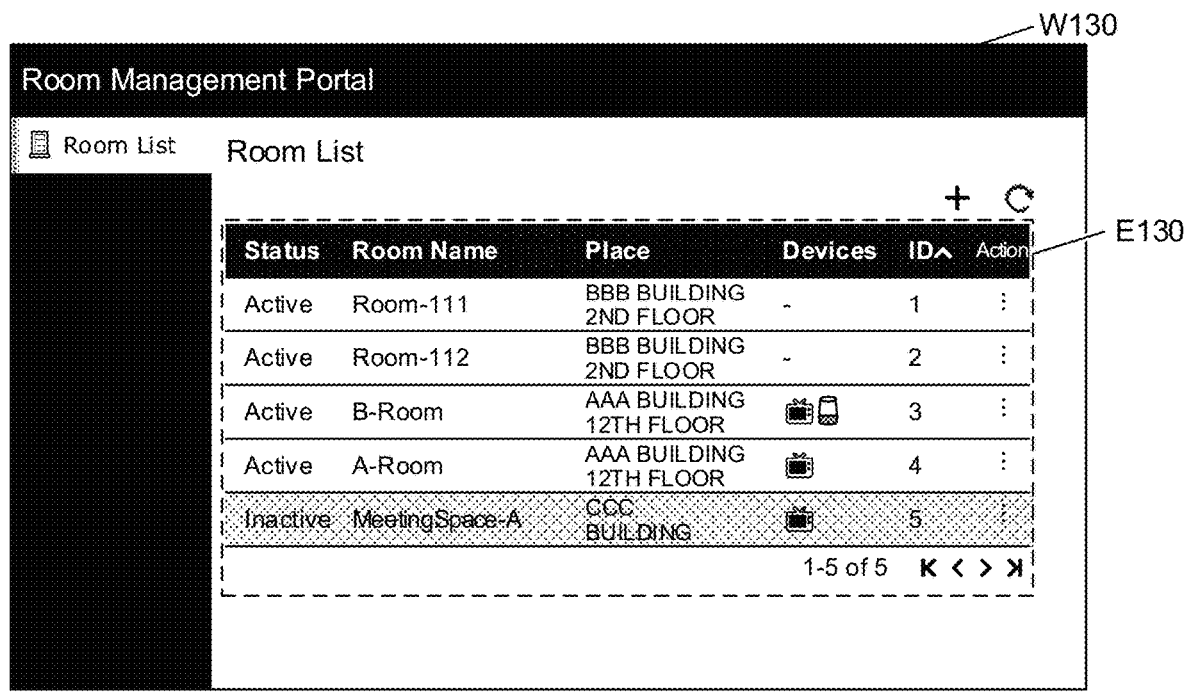
FIG. 15 is a diagram showing an operation example according to the first embodiment.

FIG. 15 is an example of a display screen W130 displayed on the display unit 320 when a total of five external resources are added by the user as resources to be managed. In the example of FIG. 15, five sets of resource information are displayed in ascending order of the resource ID in the area E130 displaying the resource list. That is to say, priorities are set with respect to the resources in ascending order of the resource ID. Here, because the number of licenses if four, the four resources with the highest priority are active resources. Therefore, among the five sets of resource information displayed in the area E130, the first four sets of resource information in the display order are discriminatively displayed. On the other hand, the remaining set of resource information represents the resource information of an inactive resource. Therefore, for example, it is displayed grayed out.

As a result, the user is capable of recognizing the active resources by viewing the area E130. Furthermore, the user is capable of changing the resource information displayed in the area E130 by adding and deleting resources. At this time, the resources are activated by the resource management server 10 based on the display order of the resource list. Therefore, even when the user adds or deletes resources, it is not necessary to perform the operation of allocating licenses to the resources and activating the resources.

Figure 16:
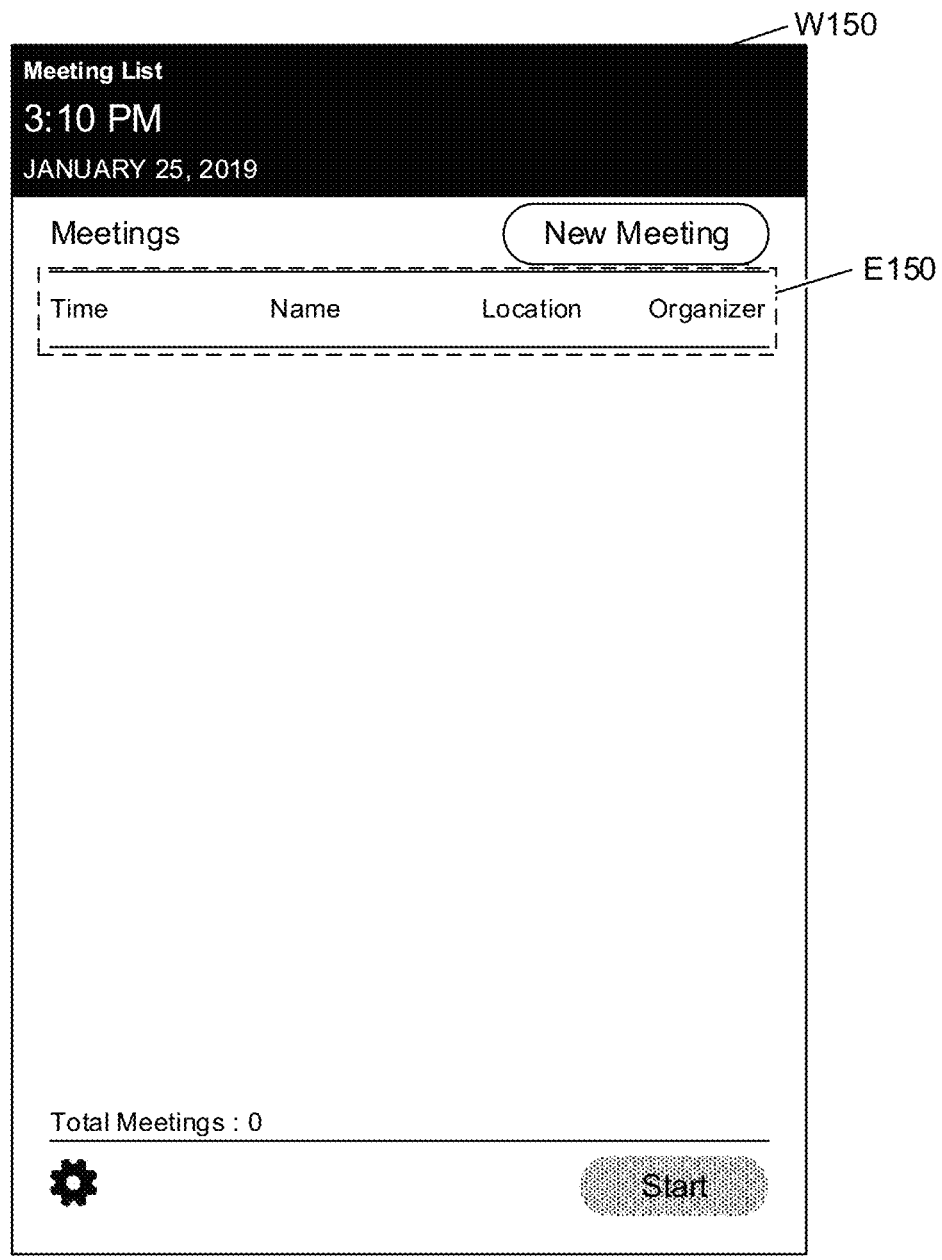
FIG. 16 is a diagram showing an operation example according to the first embodiment.
Figure 17:
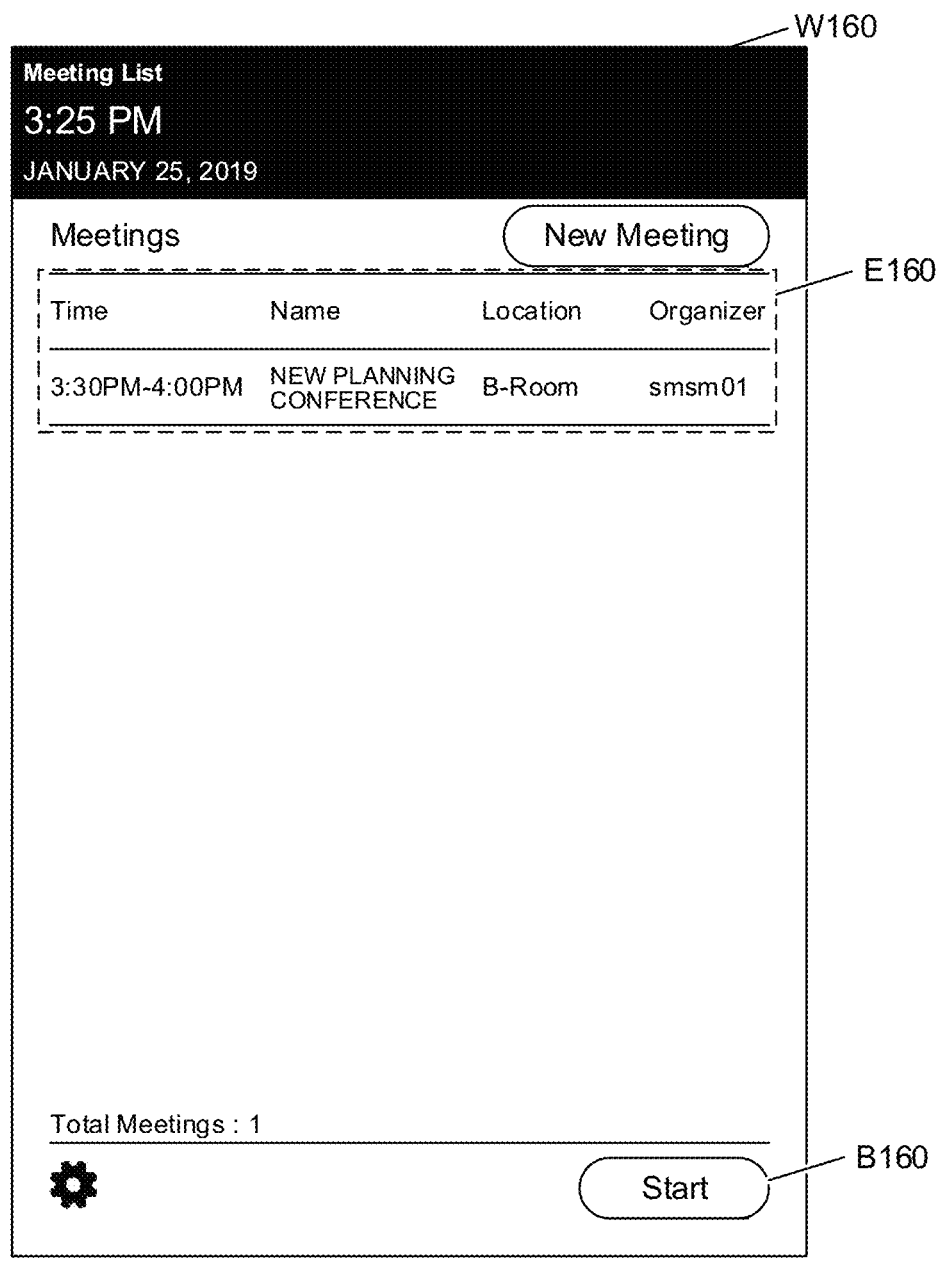
FIG. 17 is a diagram showing an operation example according to the first embodiment.

Next, an operation example of the conference support app 442 will be described with reference to FIG. 16 to FIG. 18. FIG. 16 and FIG. 17 are screens which are displayed on the display unit 420 in step S166 of FIG. 11.

FIG. 16 is an example of a display screen W150 displayed on the display unit 420 when there are no active resources. The display screen W150 includes an area E150 which displays resource information for resources which are active resources that are reserved. However, because there are no active resources, in step S162 of FIG. 11, the conference terminal device 40 acquires an empty resource list from the resource management server 10. Therefore, the area E150 does not display resource information.

FIG. 17 is an example of a display screen W160 displayed on the display unit 420 when a single resource is added by the user, and a reservation has been made with respect to the added resource. The area E160, which displays resource information, displays the resource information for a single resource (in the example of FIG. 16, the resource information for the resource having the conference room name "B-Room"). As a result of selecting the resource information and selecting the start button B160, the user is capable of instructing the conference terminal device 40 to acquire detailed information about the selected resource and to start a conference.

Figure 18:
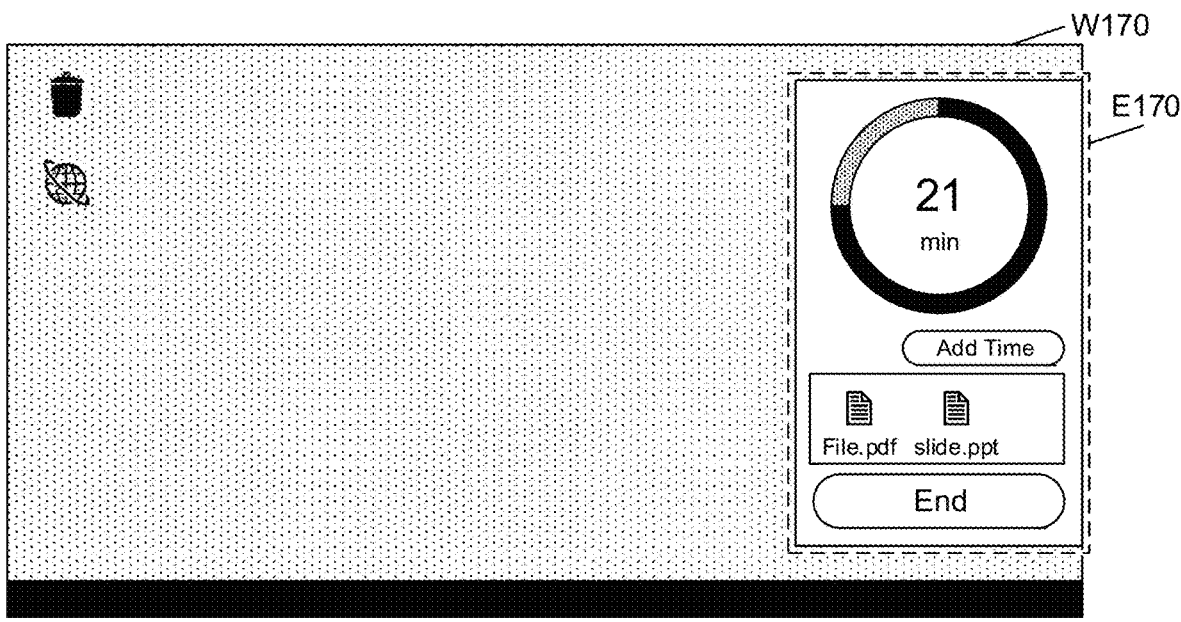
FIG. 18 is a diagram showing an operation example according to the first embodiment.

FIG. 18 is an example of a display screen W170 displayed on the display unit 420 and the display device 50 connected to the conference terminal device 40 while the conference is being held. The display screen W170 includes an area E170, which displays a UI containing the time remaining until the reservation end time, an extension button, a shortcut for displaying files attached to the information relating to the conference, and a conference end button.

In the present embodiment, the processing for a single tenant has been described. However, the system 1 may manage the resources and licenses for a plurality of tenants. In this case, the resource management server 10 specifies the tenant using the management terminal device 30 prior to performing control that displays the resource list on the management terminal device 30 in step S102. For example, the resource management server 10 executes the main processing after receiving information from the management terminal device 30 that enables the tenant to be specified. As a result, the resource management server 10 is capable of displaying the resource list and allocating licenses for each tenant.

Furthermore, when a license expiration date is stored in the license information, and the expiration date is approaching, the resource management server 10 may notify the user of this fact in advance. Moreover, even when the license expiration date arrives and the number of licenses decreases, if a new license agreement is obtained by the business operator such as a tenant, the resource management server 10 newly activates resources according to the increased number of licenses resulting from the new agreement. The resource management server 10 activates resources according to the number of licenses. Therefore, even when the expiration date is different for each license, it is not necessary for the user to perform the operation of allocating licenses according to the respective expiration dates, which is highly convenient and efficient.

In addition, in the present embodiment, whether or not a resource is active is determined based on the resource state information included in the resource information, but this need not be the case. For example, the resource IDs of the active resources may be stored in the license information. In this case, the resource management server 10 is capable of recognizing the resource states by acquiring license information from the license management server 20. Furthermore, when the resource management server 10 sets the resource states, it may transmit a request to the license management server 20 to change the resource states.

In the present embodiment, the description assumes that the controller 100 activates a resource by allocating a license to the resource, and discriminatively displays the active resources. However, the active resources may be discriminatively displayed without allocating licenses to the resources. Specifically, the controller 100 may discriminatively display the resource list displayed in step S102 so as to indicate that the resources at the top of the order, which are equivalent in number to the number of licenses acquired based on the license information, are active. Even in this case, the resource management server 10 is capable of discriminatively displaying the resources so as to indicate which resources are active.

Furthermore, in the present embodiment, the resource management server and the conference management server are separate. Therefore, the system as a whole does not become complicated. In addition, the cost does not increase in environments where there are many users and few resources (conference rooms).

As described above, in the present embodiment, the resource management server can realize license management which is easy to understand and highly convenient for users.

2. Second Embodiment

Next, a second embodiment will be described. Unlike the first embodiment, the second embodiment is an embodiment that enables the display order of the resource list to be changed by means of a user operation. The present embodiment replaces FIG. 8 of the first embodiment with FIG. 19. In addition, the same reference numerals are given to the same functional units and processing, and the description will be omitted.

Furthermore, in the present embodiment, the resource information stored in the resource information storage area 122 further stores a priority in addition to the resource ID, attributes, and the resource state. In the present embodiment, the priority is represented by an integer value of 0 or more, and a smaller value represents a higher priority.

2.1 Processing Flow

Figure 19:
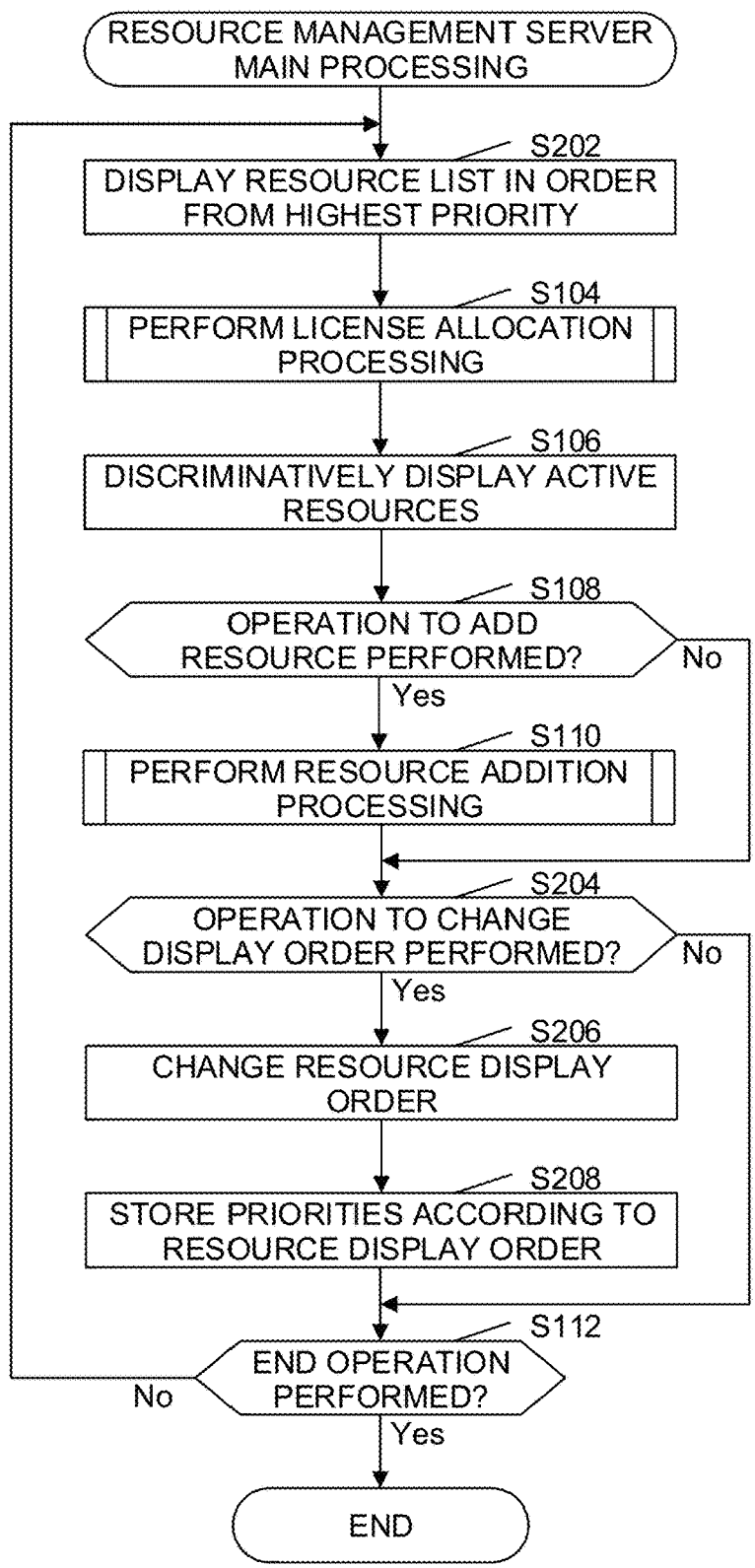
FIG. 19 is a flow diagram for describing the flow of main processing in a resource management server according to a second embodiment.

The main processing in the resource management server 10 of the present embodiment will be described with reference to FIG. 19. The controller 100 firstly performs control that displays the resources in a list in order from the highest priority resource (step S202). For example, the controller 100 reads resource information from the resource information storage area 122, and arranges the resource information in order from the highest priority. Then, the controller 100 transmits to the management terminal device 30 resource information which has been arranged in order from the highest priority.

Next, the license allocator 104 executes license allocation processing (step S104). In the license allocation processing of the present embodiment, of the license allocation processing flow shown in FIG. 9 of the first embodiment, the processing of step S126 is replaced by processing which rearranges the resource list based on the priority order. As a result, in the present embodiment, the resources are activated in order from the highest priority stored in the resource information.

Furthermore, the controller 100 performs control that discriminatively displays the active resources (step S106). The controller 100 may execute the processing of step S202 and step S106 after the license allocator 104 executes license allocation processing. As a result, the controller 100 is capable of performing control that displays the resource list and discriminatively displays the resources after determining the resource states in advance based on the priorities.

Moreover, when the user performs an operation that adds a resource, the resource manager 102 executes resource addition processing (step S110). Note that, in the resource addition processing of the present embodiment, of the license allocation processing flow shown in FIG. 10 of the first embodiment, the resource manager 102 determines the priority of the resource to be added when the processing of step S146 is executed. Further, the resource manager 102 stores resource information, which includes information relating to the selected resource and the determined priority, in the resource information storage area 122.

The resource manager 102 sets the priority of the resource to be added, for example, to the lowest value within the resource information stored in the resource information storage area 122. Specifically, the resource manager 102 sets, as the priority value of the added resource, the maximum value that can be assigned as the priority, or a value obtained by adding 1 to the largest value among the priority values included in the resource information stored in the resource information storage area 122. As a result of setting the priority in this manner, it is possible to prevent the license allocation processing from deactivating a resource which is already active. Note that, when the user performs an operation that preferentially activates the added resource, the resource manager 102 may set the priority of the resource to the highest value, that is to say, to "0". Furthermore, the resource manager 102 may set the priority of the added resource to a predetermined value which is determined by a setting or the like.

Next, the controller 100 determines whether or not the user has performed an operation that changes the display order of the resources (step S204). For example, when information is received from the management terminal device 30 indicating that the display order of the resources has been changed, the controller 100 determines that an operation that changes the display order of the resources has been performed.

The information indicating that the display order of the resources has been changed is, for example, information that enables the resources whose display order has been changed and the display order of the resources after the change to be specified, or list information in which the resources in the list to be displayed on the display unit 320 are arranged in the display order.

In this case, when the user rearranges the display order of the resources in the list displayed on the display unit 320 by means of a mouse operation or the like, the controller 300 of the management terminal device 30 transmits information indicating the display order of the resources has been changed to the resource management server 10.

When an operation is performed that changes the display order of the resources, the controller 100 changes the display order of the resources based on the operation (step S206). For example, the controller 100 changes the arrangement order of the resource information transmitted to the management terminal device 30 in step S202 based on the information indicating that the display order of the resources has been changed. Here, in step S204, when information is received that enables the resources whose display order has been changed and the display order of the resources after the change to be specified, the controller 100 inserts the resource information of the resources whose display order has been changed into the positions of the display order after the change. Furthermore, in step S204, when list information is received which has the resources in the list displayed on the display unit 320 arranged in the display order, the arrangement order of the resource information is changed based on the received list information. In this way, the controller 100 changes the display order of the resources by changing the arrangement of the resource information, and is capable of obtaining the display order of the resources after the change.

Next, the controller 100 determines the priority of each resource based on the display order of the resources, which was changed in step S206, and stores the priorities in the resource information (step S208). For example, the controller 100 determines the priorities of the resources according to the display order by setting the priority of the resource with the highest display order (first in the display order) to "0", setting the priority of the resource with the next highest display order (second in the display order) to "1", and so on. In this way, by storing the priorities according to the display order, the controller 100 is capable of setting a higher priority to resources which are higher in the display order.

2.2 Processing Flow

An operation example of the present embodiment will be described. In the description of the operation example, the number of licenses is assumed to be four.

Figure 20:
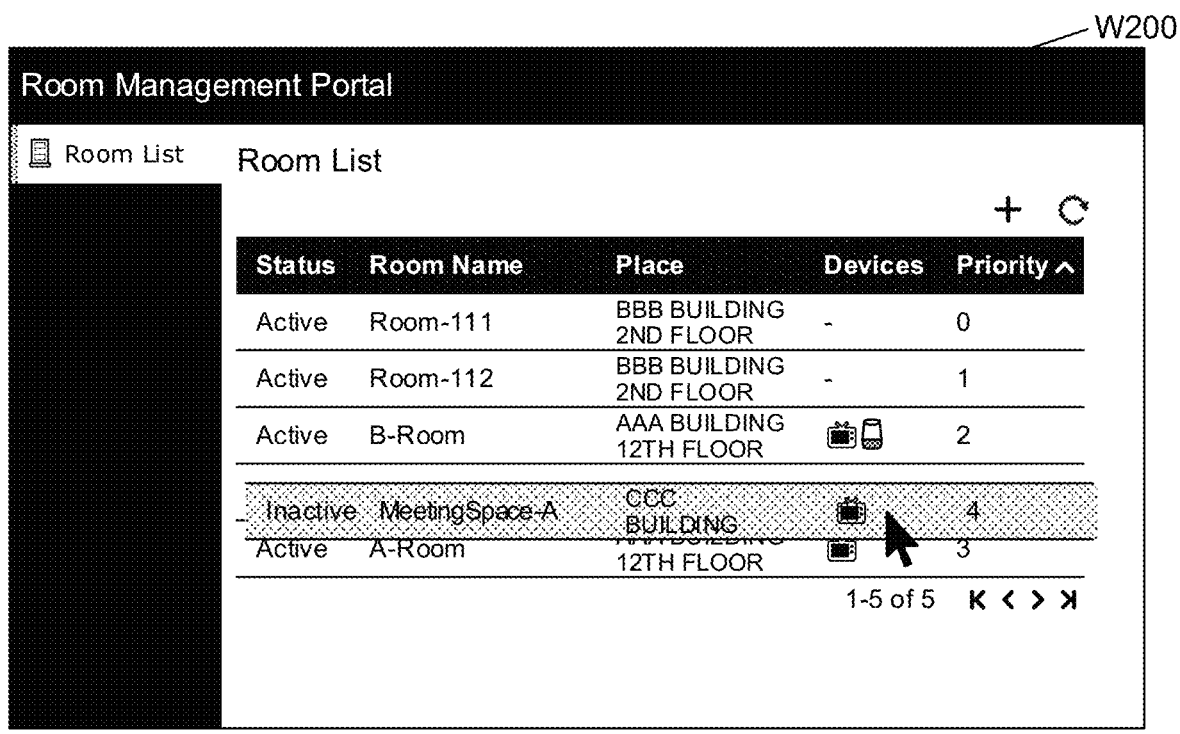
FIG. 20 is a diagram showing an operation example according to the second embodiment.

FIG. 20 is an example of a display screen W200 displayed on the display unit 320 when five resources are added by the user. Furthermore, FIG. 20 shows a state in which an operation to change the display order of the resources is being performed by the user. Specifically, FIG. 20 shows a state where a mouse drag operation is being performed to perform an operation that moves the resource having a priority of "4" between the resource having a priority of "2" and the resource having a priority of "3". When the user performs a mouse drop operation in this state, the display order of the resources is changed, and the display order after the change becomes the priority of each resource. Note that the operation to change the display order does not have to be a mouse drag operation. For example, it may be an operation that selects buttons that raise or lower the priority of the selected resource.

When the user performs a drop operation in the state shown in FIG. 20, the management terminal device 30 transmits information to the resource management server 10 indicating that the display order of the resources has been changed. For example, the management terminal device 30 transmits the resource ID of the resource having the conference room name "MeetingSpace-A", and information indicating that the display order has been changed to the fourth from the top. The resource management server 10 changes the display order of the resources based on the information received from the management terminal device 30, and stores the display order of the resources as the priorities. In the example of FIG. 20, the resource having a priority of "4" is set with a priority of "3", and the resource having a priority of "3" is moved down the display order and set with a priority of "4". As a result, the resource whose priority was "4" before the change in the display order of the resources is activated due to having a priority of "3". Further, the resource having the priority of "3" before change in the display order of the resources is deactivated due to having a priority of "4".

According to the present embodiment, when the user changes the display order of the resources, the resource management server is capable of allocating licenses based on the display order of the resources after the change.

3. Third Embodiment

Next, a third embodiment will be described. Unlike the second embodiment, the third embodiment is an embodiment in which the priorities are determined by usage history information, which is conference log information, rather than by a user operation. The present embodiment replaces FIG. 19 of the second embodiment with FIG. 25. In addition, the same reference numerals are given to the same functional units and processing, and the description will be omitted.

The present embodiment will be described assuming that usage history information is transmitted from the conference terminal device 40 to the priority management server 70 as a result of end processing being performed by the controller 400.

3.1 Overall Configuration

Figure 21:
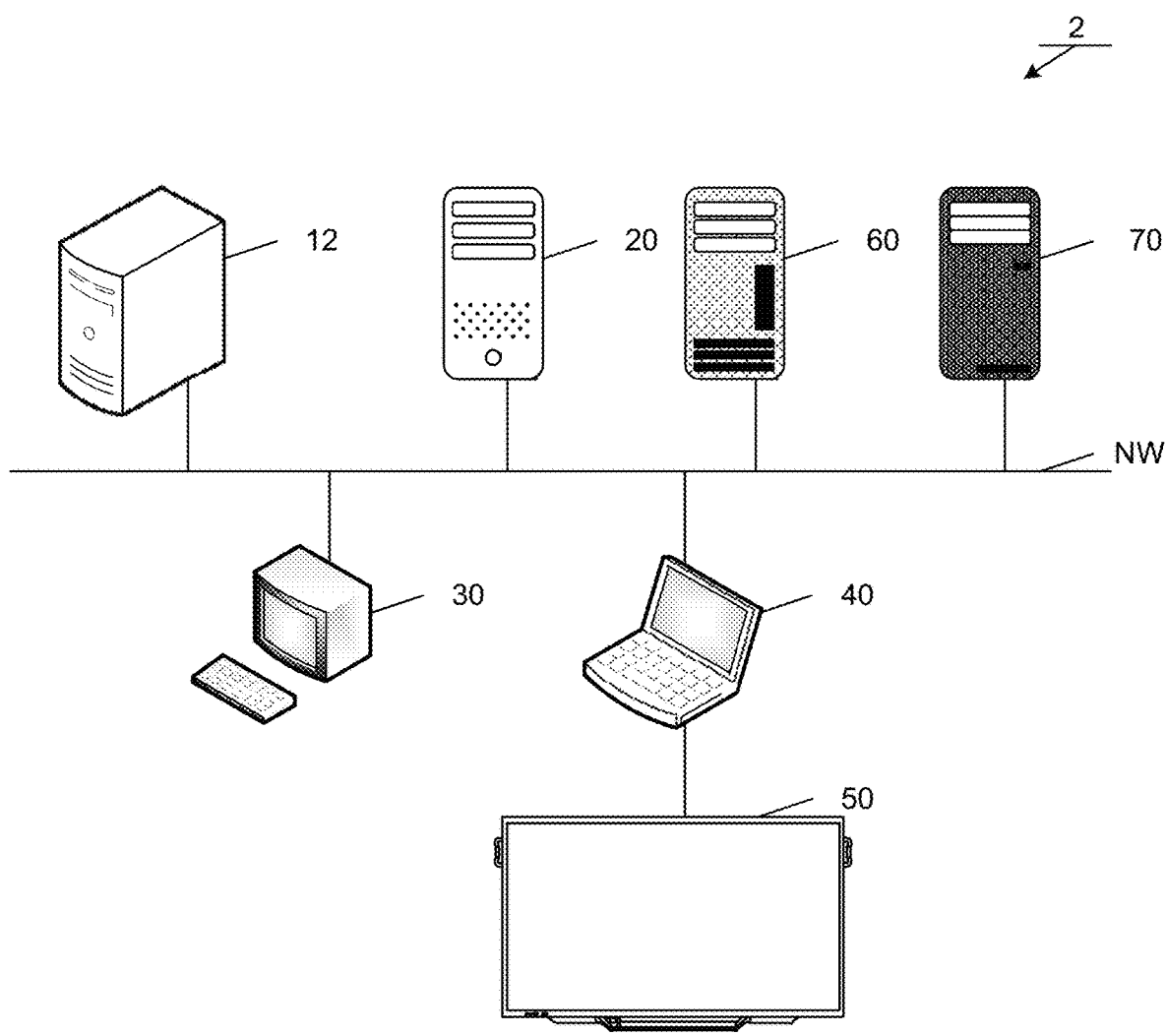
FIG. 21 is a diagram for describing an overall configuration of a resource management system according to a third embodiment.

An overall configuration of the present embodiment will be described with reference to FIG. 21. FIG. 21 is a diagram showing an overall configuration of a resource management system (hereinafter simply referred to as "system 2") according to the present embodiment. As shown in FIG. 21, unlike the system 1, the system 2 has a resource management server 12 connected to the network NW instead of the resource management server 10, and a priority management server 70 is further connected. Note that the license management server 20, the management terminal device 30, the conference terminal device 40, the display device 50, and the conference management server 60 are the same as the devices in the system 1.

Like the resource management server 10, the resource management server 12 is an information processing device that manages resource information for each tenant. The priority management server 70 is an information processing device that acquires usage history information, which indicates the usage history of a resource, and determines a priority based on the usage history information. For example, the priority management server 70 is configured by a computer such as a server.

3.2 Functional Configuration 3.2.1 Resource Management Server

Figure 22:
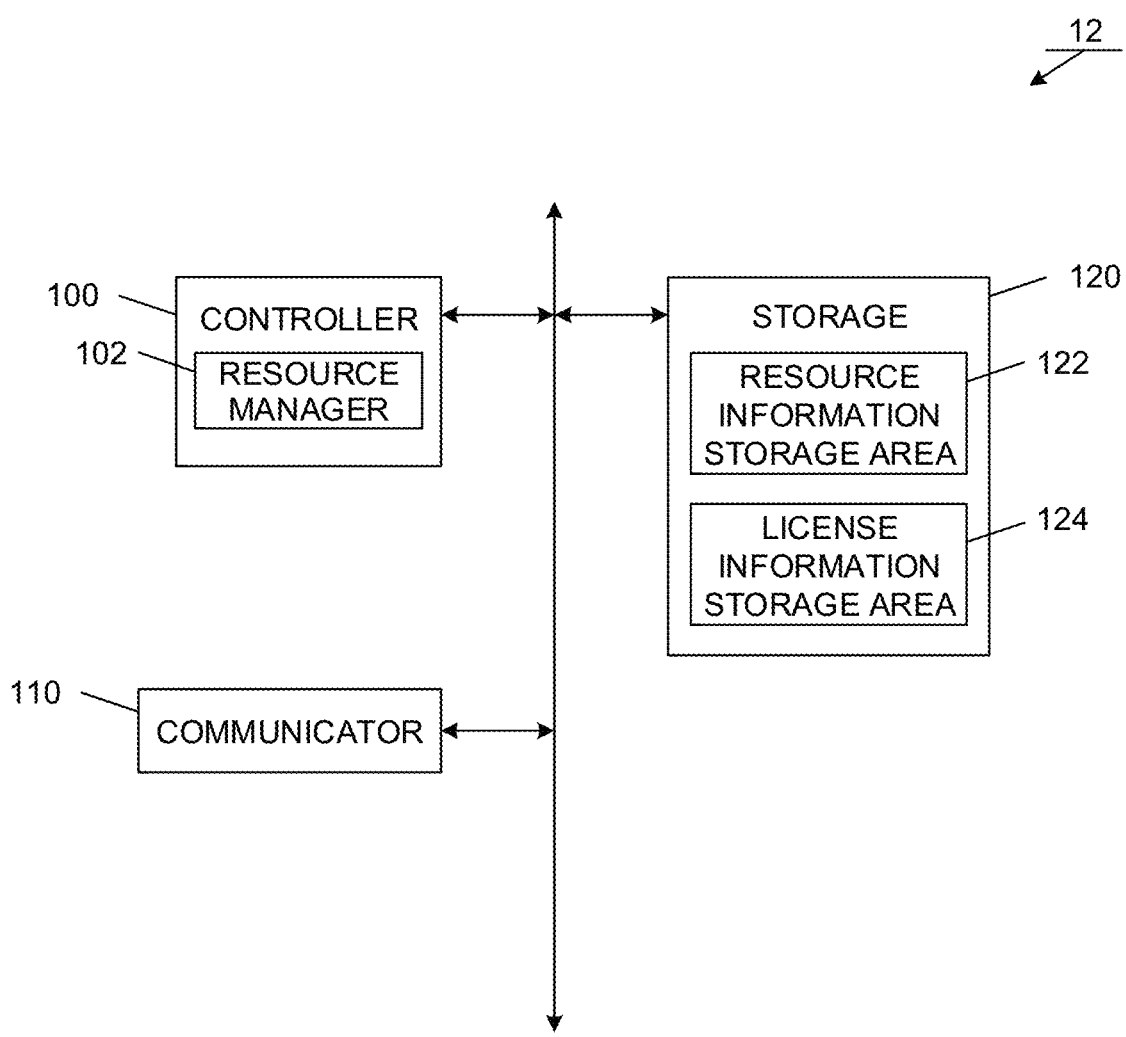
FIG. 22 is a functional block diagram for describing a functional configuration of a resource management server according to the third embodiment.

The functional configuration of the resource management server 12 will be described with reference to FIG. 22. As shown in FIG. 22, unlike the resource management server 10, the resource management server 12 has a configuration which excludes the license allocator 104.

Furthermore, in the present embodiment, the resource information stored in the resource information storage area 122 does not have to store priority information.

3.2.2 Priority Management Server

Figure 23:
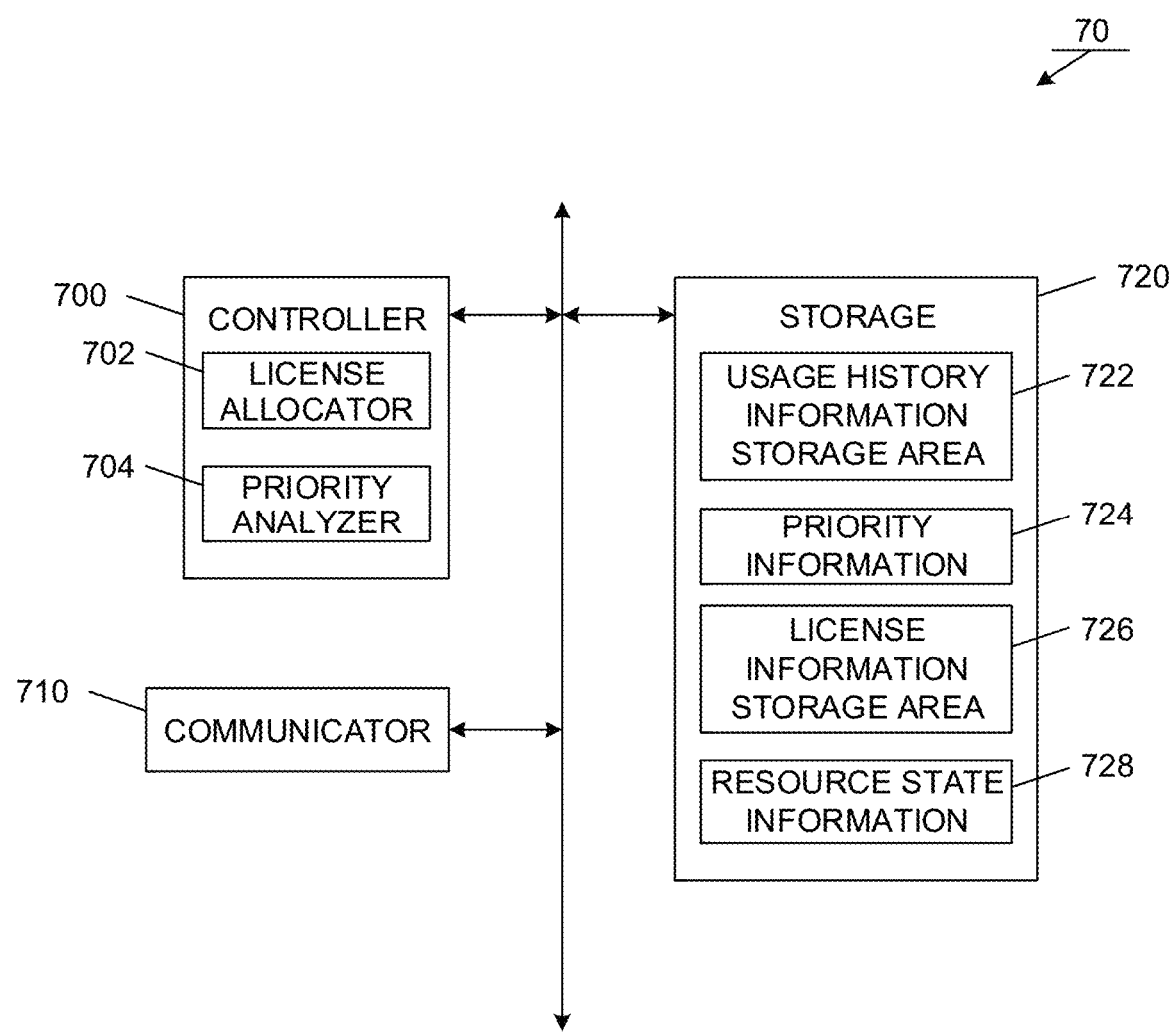
FIG. 23 is a functional block diagram for describing a functional configuration of a priority management server according to the third embodiment.

FIG. 23 is a functional block diagram for describing a functional configuration of the priority management server 70. The priority management server 70 includes a controller 700, a communicator 710, and a storage 720.

The controller 700 is a functional unit for controlling the priority management server 70 as a whole. The controller 700 realizes various functions by reading and executing various programs, and is constituted by one or more computation devices (for example, a CPU).

Furthermore, the controller 700 realizes the functions of a license allocator 702 and a priority analyzer 704 by reading and executing a program stored in the storage 720.

The license allocator 702 realizes processing that activates, among the resources, resources up to the number of licenses (license allocation processing). The license allocator 702 is the same functional unit as the license allocator 104 in the first embodiment.

The priority analyzer 704 analyzes usage history information and realizes processing that determines the priorities of the resources (priority analysis processing).

The communicator 710 is a functional unit for communicating with other devices via the network NW. The network NW may be connected by wired connections or wireless connections. For example, the communicator 310 is constituted by a communication module such as an NIC used by a wired/wireless LAN.

The storage 720 is a functional unit that stores various programs and various data required for operation of the priority management server 70. For example, the storage 720 is constituted by an SSD, which is a semiconductor memory, an HDD, which is a magnetic disk, or the like.

The storage 720 is provided with a usage history information storage area 722 and a license information storage area 726, and stores priority information 724 and resource state information 728.

The usage history information storage area 722 is an area for storing usage history information. For example, as shown in FIG. 24, the usage history information in the present embodiment stores a resource ID (for example, "1"), a usage date and time (for example, "Jul. 1, 2019, 9:00 to 10:00), a usage device (for example, "display device") indicating the device that was used, the existence of a reservation (for example, "yes") to indicate whether or not the usage took place after a reservation was made, the number of participants (for example, "5 people"), and the existence of a reservation extension (for example, "yes (15 minutes)") to indicate whether or not the reservation was extended.

The usage history information may also store information other than the information mentioned above. For example, information may be stored such as the usage duration of the device that was used, and whether or not there was a difference between the start time of the conference and the reservation time.

The priority information 724 is information which stores the priority for each resource. The license information storage area 726 is an area for storing license information. The resource state information 728 is information which stores, for each resource, whether or not the resource is active.

3.3 Processing Flow 3.3.1 Resource Management Server

Next, the processing of the resource management server 12 and the priority management server 70 in the present embodiment will be described. First, the main processing executed as a result of the controller 100 of the resource management server 12 reading and executing a program from the storage 120 will be described with reference to FIG. 25 and FIG. 26.

Figure 25:
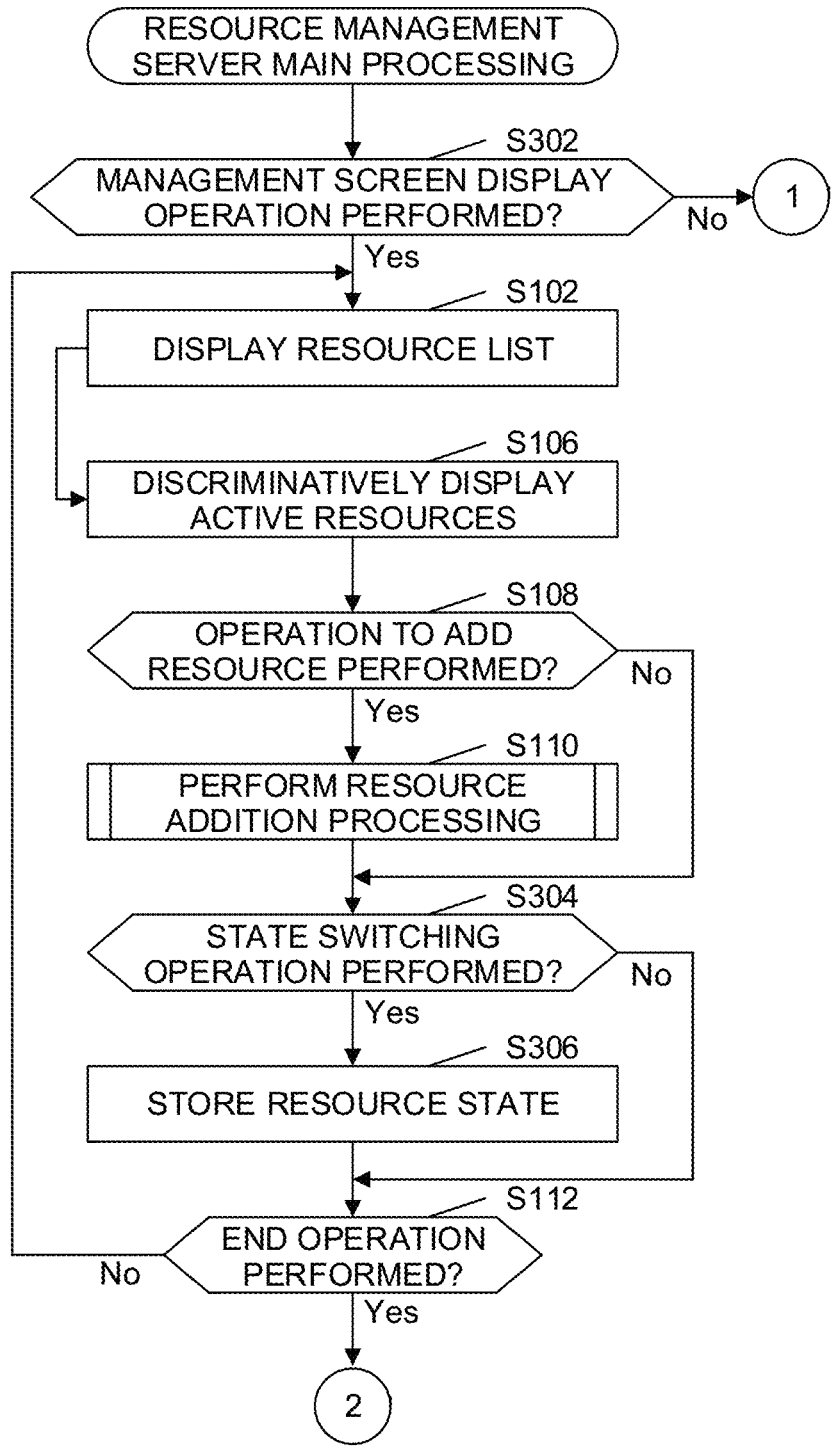
FIG. 25 is a flow diagram for describing the flow of main processing in a resource management server according to the third embodiment.

First, a description will be given with reference to FIG. 25. The controller 100 firstly determines whether or not a management screen display operation has been performed (step S302). For example, the controller 100 determines that a management screen display operation has been performed when it becomes connected to the resource management server 12 via a web browser or an application for performing resource management.

If a management screen display operation has been performed, the controller 100 performs control that displays the resources in a list (step S302; Yes→step S102). For example, the controller 100 reads resource information from the resource information storage area 122, lists the resource information which has an "active" resource state, and then lists the resource information which has an "inactive" resource state. Then, the controller 100 transmits to the management terminal device 30 the resource information which has been arranged in order of the resource state.

Furthermore, the controller 100 determines whether or not a state switching operation has been performed (step S304). A state switching operation is an operation that changes the resource state from active to inactive, or from inactive to active. For example, the controller 100 determines that a state switching operation has been performed when information is received from the management terminal device 30 which enables the target resource whose state is to be switched and the state after the switch to be specified. In this case, when the user selects a resource and performs an operation to switch the state, the controller 300 of the management terminal device 30 transmits to the resource management server 12 information which includes the resource ID of the selected resource and the state after the switch.

When a state switching operation is performed, the controller 100 reads the resource information of the resource whose state is to be switched from the resource information storage area 122, and stores the resource state after the switch as the resource state (step S304; Yes→step S306). As a result, the controller 100 is capable of switching the state of a resource based on a user operation.

In the present embodiment, the priority of the resources is determined by the priority management server 70. Therefore, the resource manager 102 omits the processing that determines the priorities in step S146 of the resource addition processing, and stores the resource selected by the user in the resource information storage area 122. Furthermore, in the present embodiment, the resource manager 102 may set the state of the resource to inactive at the time the resource is added.

Figure 26:
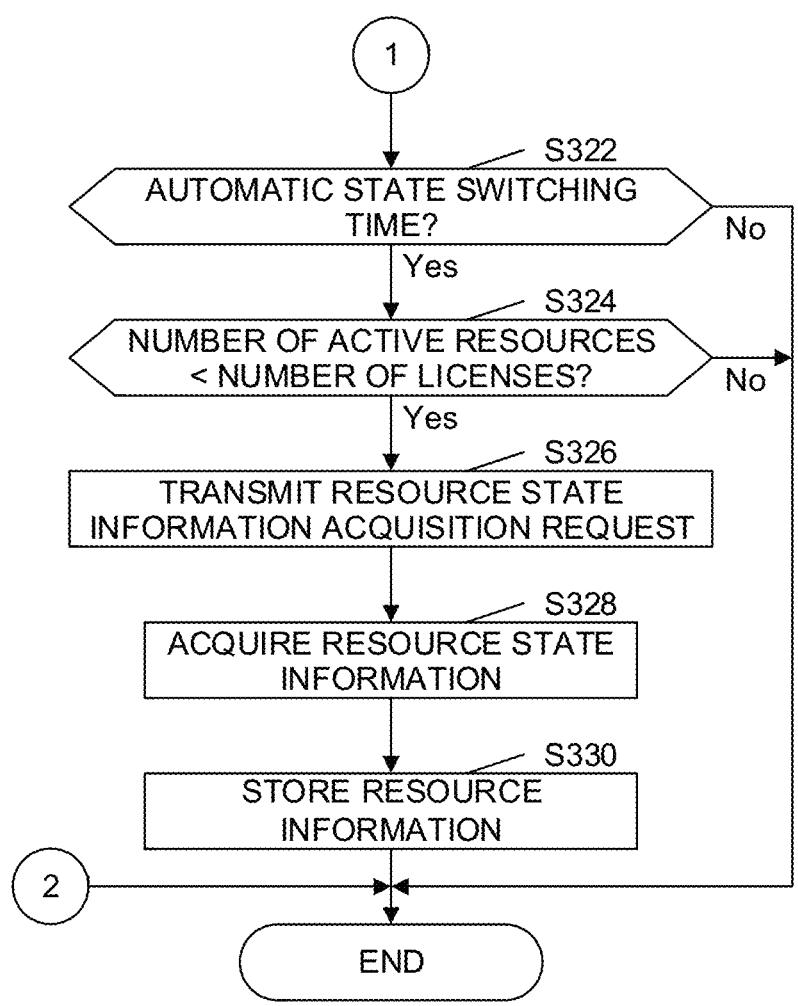
FIG. 26 is a flow diagram for describing the flow of main processing in the resource management server according to the third embodiment.

On the other hand, the processing performed when a management screen display operation is not performed in step S302 will be described with reference to FIG. 26. If a management screen display operation is not performed, the controller 100 determines whether or not it is currently an automatic state switching time (step S322). An automatic state switching time refers to a time in which the system 2 automatically switches the resource state, such as at a predetermined time (for example, 2 AM). The automatic state switching time may be stored in the storage 120, or may be set by the user. The automatic state switching time may be, for example, once per day, two or more times per day, or once per week. Furthermore, the controller 100 may determine that it is currently an automatic state switching time when an operation for automatically switching the resource state is performed by the user.

If it is currently an automatic state switching time, the controller 100 determines whether or not the number of active resources is less than the number of licenses based on the license information (step S322; Yes→step S324). If the number of active resources is less than the number of licenses, the controller 100 transmits a resource state information acquisition request to the priority management server 70 (step S324; Yes→step S326). A resource state information acquisition request is a request to acquire the resource state information 728. The controller 100 may transmit, as the resource state information acquisition request, information such as the resource IDs of the resources and the currently active resource IDs to the priority management server 70.

Next, the controller 100 acquires the resource state information 728 from the priority management server 70 (step S328). Then, based on the acquired resource state information 728, the controller 100 changes and stores the resource state of the resource information stored in the resource information storage area 122 (step S330). Specifically, the controller 100 reads the resource state of each resource stored in the resource state information 728 one at a time, and updates the resource state of the corresponding resource information with the read resource state.

In this way, the controller 100 is capable of switching the resource state based on the resource state information 728 by executing the processing from step S322 to step S330.

3.2.2 Priority Management Server

Figure 27:
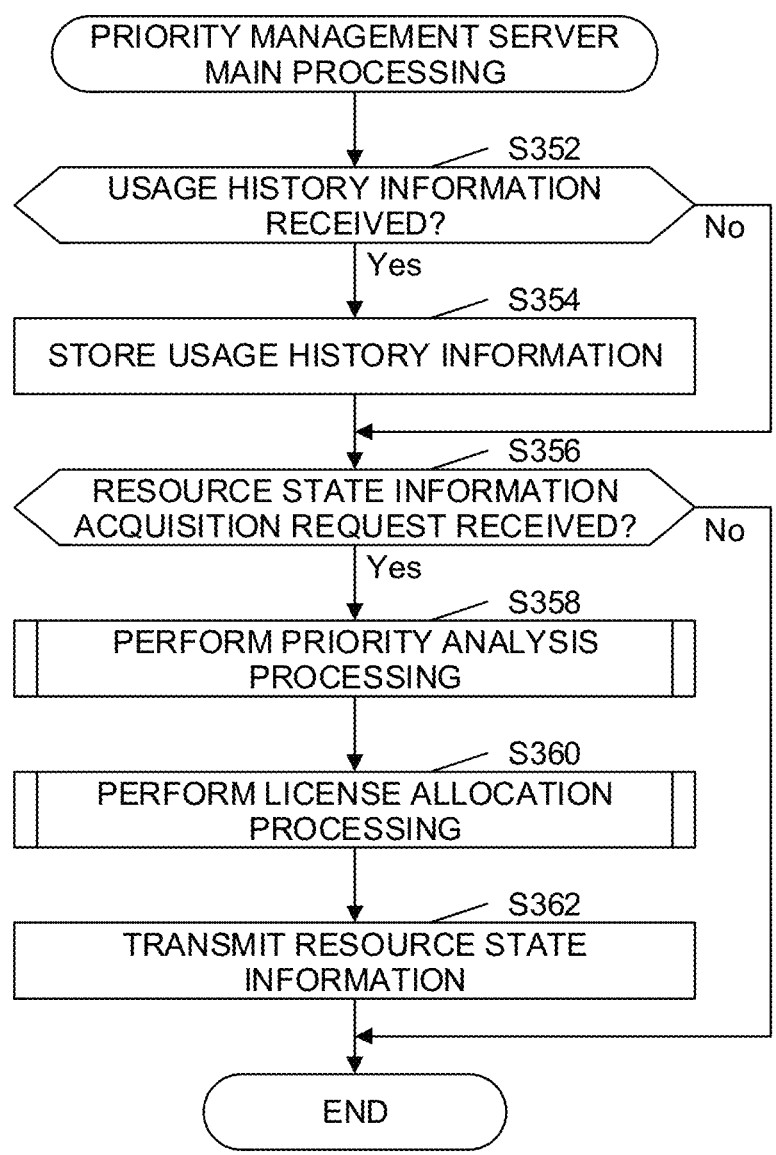
FIG. 27 is a flow diagram for describing the flow of main processing in the priority management server according to the third embodiment.

Next, the main processing executed as a result of the controller 700 of the priority management server 70 reading and executing a program from the storage 720 will be described with reference to FIG. 27.

The controller 700 firstly determines whether or not usage history information has been received from the conference terminal device 40 (step S352). If usage history information has been received, the controller 700 stores the received usage history information in the usage history information storage area 722 (step S352; Yes→step S354).

Then, the controller 700 determines whether or not a resource state information acquisition request has been received from the resource management server 12 (step S356). If a resource state information acquisition request has been received, the priority analyzer 704 executes priority analysis processing, which is processing executed by the priority analyzer 704 (step S356; Yes→step S358).

The priority analysis processing is processing which analyzes the usage history information and determines the priorities of the resources. The methods for determining the priorities include the following methods.

(1) Method Based on Evaluation Value

The priority analyzer 704 calculates an evaluation value for each resource from the usage history information, and determines the priorities in order of the evaluation values. For example, the priority analyzer 704 calculates a resource usage rate from the usage dates and times in the usage history information, and a device usage rate from the used device. Then, a value obtained by multiplying the respective usage rates by a predetermined weight and adding the products together is used as the evaluation value. In this case, as the evaluation value increases, the more the resource is considered to be frequently used. Therefore, as the evaluation value of the resource increases, the priority becomes higher.

Note that, of the usage history information, the information and the weights used to calculate the evaluation value may be set by the user or set in advance in the priority management server 70.

(2) Method Using Machine Learning

The priority analyzer 704 uses a learned model that takes the usage history information as input and outputs an evaluation value. The priorities are determined based on the output when the usage history information stored in the usage history information storage area 722 is used as input.

Furthermore, the priority analyzer 704 stores the priority determined for each resource in the priority information 724. Among the resources, the priority analyzer 704 may set a high priority to the resources that are already active. On the other hand, the priority analyzer 704 may set a lower priority to resources without a usage record, which have no usage history information, than resources that have a usage record.

Next, the license allocator 702 executes license allocation processing based on the priority information 724 (step S360). In the present embodiment, the license allocator 702 executes substantially the same processing as the processing executed by the license allocator 104 in the first embodiment shown in FIG. 9. However, part of the processing is replaced.

Figure 9:
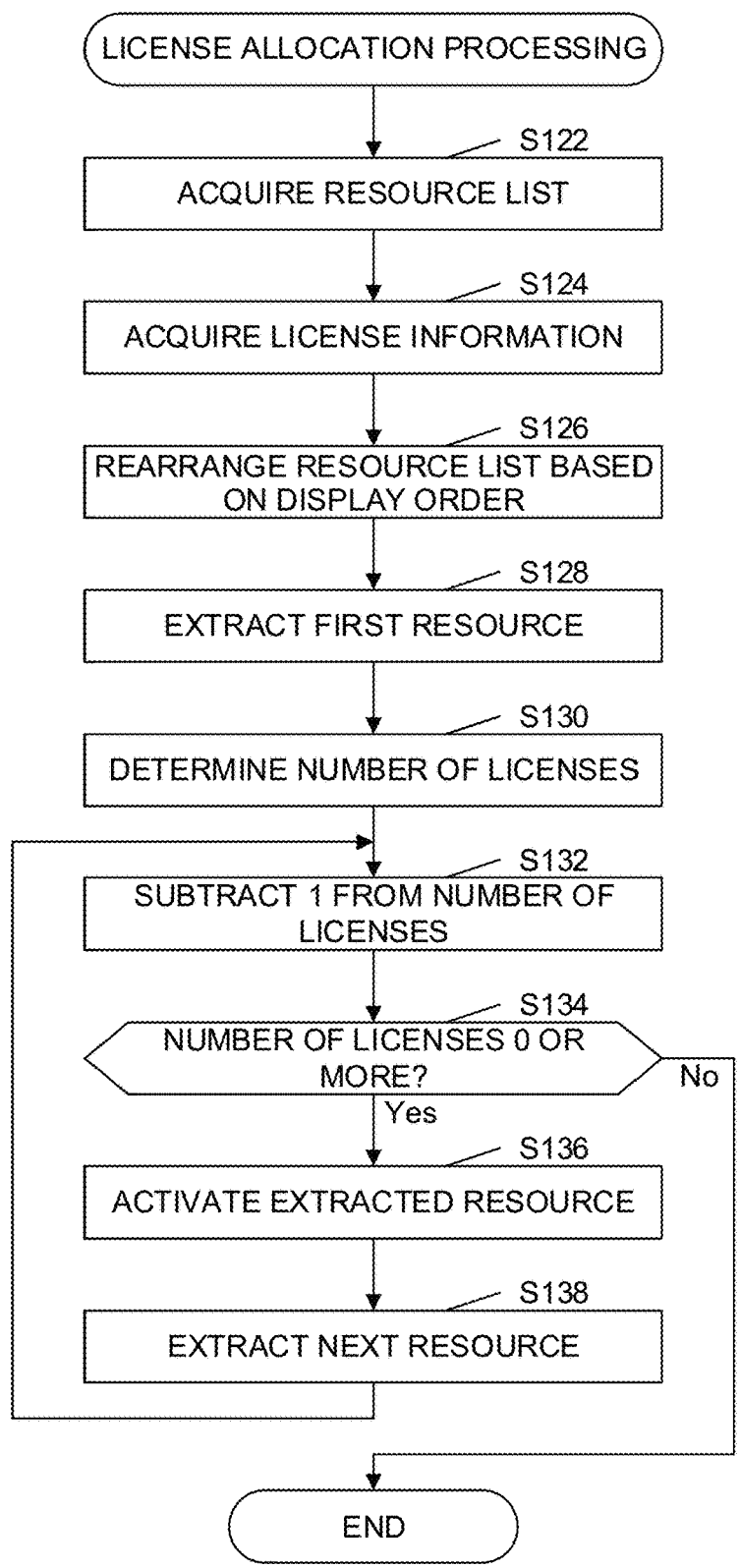
FIG. 9 is a flow diagram for describing the flow of license allocation processing according to the first embodiment.

Specifically, in step S122 of FIG. 9, the license allocator 702 acquires the resource list from the resource management server 12. In step S124, the license allocator 702 stores the license information acquired from the license management server 20 in the license information storage area 726. In step S126, the license allocator 702 rearranges the resource list based on the priority information 724. In step S130, the license allocator 702 acquires the number of licenses based on the license information stored in the license information storage area 726. Furthermore, the license allocator 702 stores information relating to the resources to be activated in the resource state information 728.

Next, the controller 700 transmits the resource state information 728 to the resource management server 12 (step S362). As a result, the priorities of the resources are determined by the priority management server 70, which enables resources equivalent to the number of licenses to be activated from the highest priority resource.

In the present embodiment, it has been described that the resource state is switched by a user operation. However, the resource management server 12 may change the display order of the resources based on a user operation as in the second embodiment.

Furthermore, in step S326, the resource management server 12 may transmit information relating to the display order of the resources set by the user, or information that enables the resources activated by the user to be specified to the priority management server 70. If the priority management server 70 receives information relating to the display order of the resources, it may determine the final priorities in the priority analysis processing from priorities based on the display order set by the user and priorities determined based on the usage history information. At this time, the priority management server 70 may use a method of calculating the evaluation value that more readily reflects the priorities set by the user. For example, the priorities set by the user may be incremented by a predetermined value or may be weighted more heavily than the priorities determined based on the usage history information. Furthermore, if the priority management server 70 receives information that enables the resources activated by the user to be specified, the resources activated by the user may always be provided with a high priority in the priority analysis processing. As a result, the priority management server 70 always activates the resources activated by the user irrespective of the usage history information, and the priorities of the resources that are not activated by the user can be set based on the usage history information.

Furthermore, in the present embodiment, the description assumes that the priority management server 70 acquires the usage history information from the conference terminal device 40, but this need not be the case. For example, the conference terminal device 40 may transmit the usage history information to a log server. In this case, the priority management server 70 may acquire the usage history information from the log server.

According to the present embodiment, the resource management server automatically activates, among the inactive resources, resources equivalent to the number of licenses that have the highest priority according to priorities determined based on usage history information. Therefore, the user is capable of automatically activating resources that have a record of being frequently used, even if the resource is not explicitly activated. Furthermore, when reviewing the resources that are used, the user can temporarily deactivate the resources, and then automatically activate resources based on the usage history information.

4. Fourth Embodiment

Next, a fourth embodiment will be described. The present embodiment, like the third embodiment, is an embodiment in which the priorities are determined by usage history information. However, it differs in the aspect that the resource states are determined by the resource management server. The present embodiment replaces FIG. 19 of the second embodiment with FIG. 28. In addition, the same reference numerals are given to the same functional units and processing, and the description will be omitted.

The resource management system of the present embodiment is a system configured by further connecting a priority management server 72 to the network NW of the system 1.

In the resource management server 10 of the present embodiment, the resource information stored in the resource information storage area 122 further stores a system priority and a user priority in addition to the resource ID, attributes, and the resource state. The system priority is a priority determined by the priority management server 72. The user priority is a priority determined by a user operation.

Furthermore, unlike the priority management server 70, the priority management server 72 is configured without a license allocator 702. Moreover, the priority management server 72 differs from the priority management server 70 in that the storage 720 is not provided with a license information storage area 726, and does not store resource state information 728.

Figure 28:
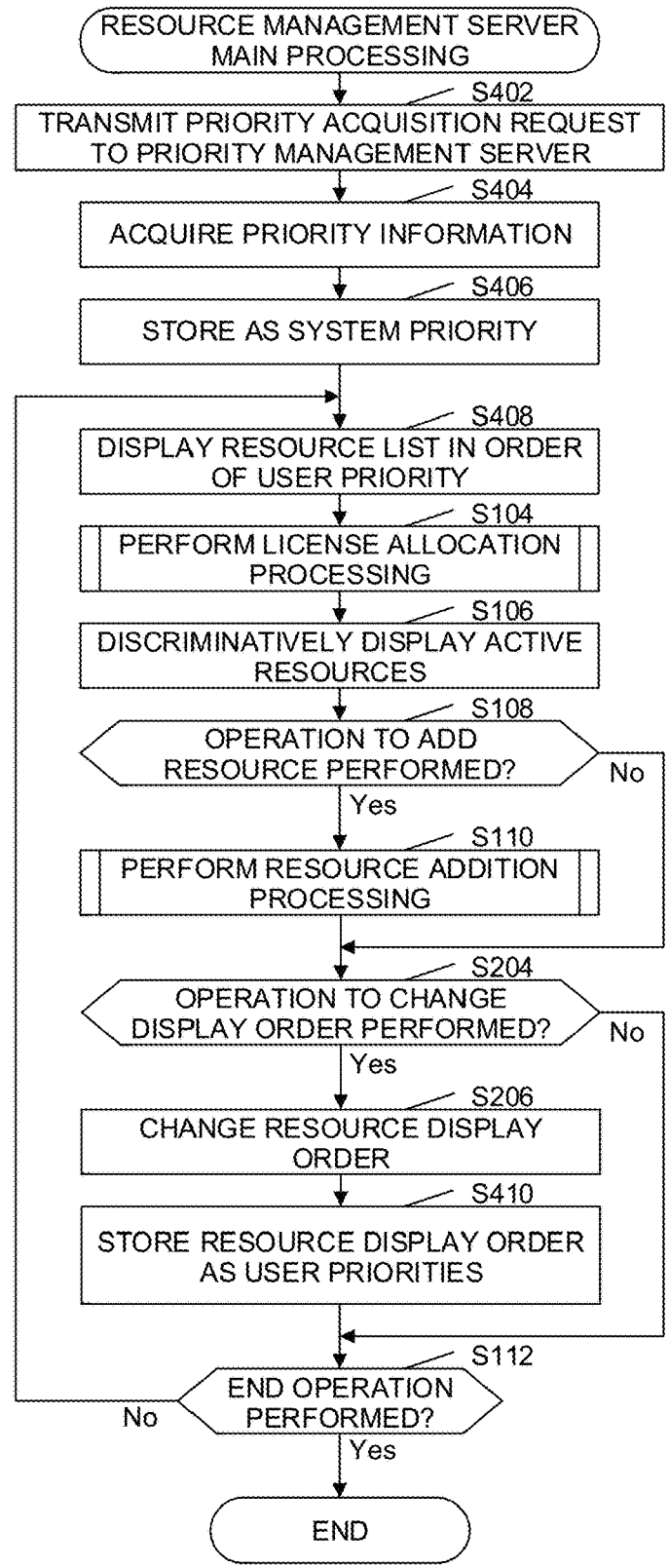
FIG. 28 is a flow diagram for describing the flow of main processing in a resource management server according to a fourth embodiment.

Next, the main processing performed by the resource management server 10 of the present embodiment will be described with reference to FIG. 28. In the present embodiment, the controller 100 firstly transmits a priority acquisition request to the priority management server 72, which is a request to acquire priority information 724 (step S402). The controller 100 acquires the priority information 724 from the priority management server 72, and stores resource information in which the priorities stored in the priority information 724 are set as system priorities (step S404→step S406). Specifically, the controller 100 reads the priority information of each resource stored in the resource state information 728 one resource at a time, and updates the system priority of the corresponding resource information.

Then, the controller 100 performs with respect to the resources that displays the resources in a list in order of the user priorities of the resources (step S408). That is to say, in the present embodiment, the order in which the resource information displayed on the display unit 320 is arranged is in ascending order of the user priorities stored in the resource information. The controller 100 may arrange the resource information of active resources according to the user priority, and arrange inactive resources based on the system priority. Furthermore, the controller 100 may display the system priority in addition to the list of the resources.

Next, the license allocator 104 executes license allocation processing (step S104). In the present embodiment, the license allocator 104 rearranges the order in step S126 of the license allocation processing shown in FIG. 9 into an order which takes the user priorities and the system priorities into consideration. For example, the license allocator 104 determines an evaluation value based on the user priority and the system priority, and rearranges the order based on the evaluation values. Specifically, a weighting is used which causes the system priority to be more readily reflected for resources having a lower user priority. As a result, the controller 100 is capable of more easily transferring licenses between active resources having a low user priority, and inactive resources having a record of being frequently used.

Furthermore, after the display order of the resources is changed based on an operation that changes the display order of the resources, the controller 100 determines the priorities based on the display order of the resources, and stores the priorities as user priorities (step S410). As a result, the display order changed by the user is stored as the user priorities of the resources.

4.3.2 Priority Management Server

Figure 29:
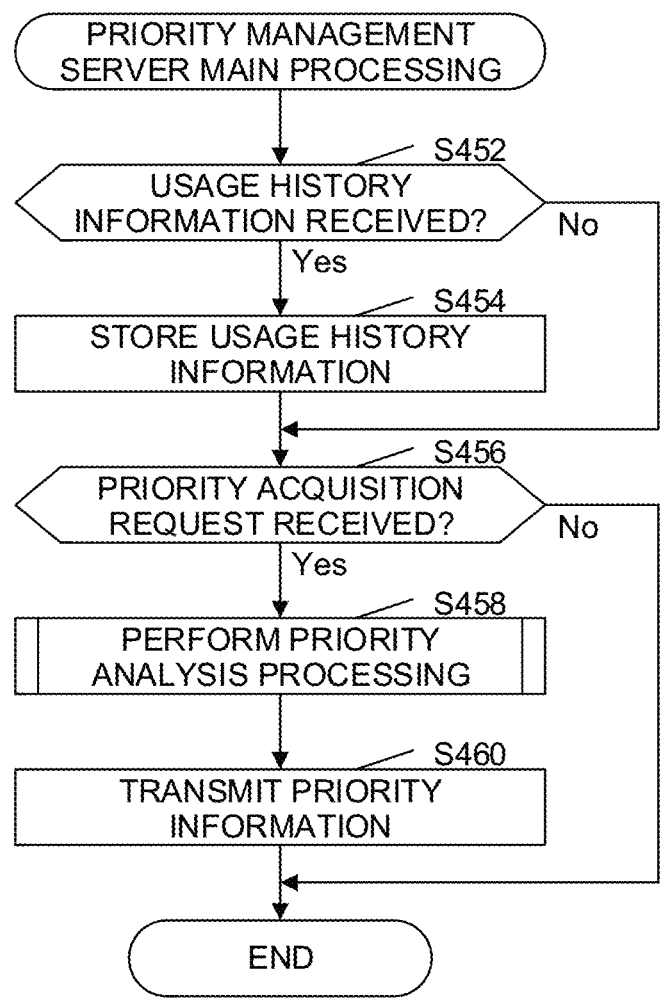
FIG. 29 is a diagram showing the flow of main processing in a priority management server according to the fourth embodiment.

The main processing in the priority management server 72 will be described with reference to FIG. 29. First, if the controller 700 receives usage history information from the conference terminal device 40, it stores the received usage history information in the usage history information storage area 722 (step S452; Yes→step S454).

Furthermore, the controller 700 determines whether or not a priority acquisition request has been received from the resource management server 10 (step S456). If a priority acquisition request has been received, the priority analyzer 704 executes priority analysis processing (step S458). The priority analysis processing is the same processing as step S358 of the third embodiment. The priority information 724 is stored by the priority analyzer 704 as a result of executing the priority analysis processing. Then, the controller 700 transmits the priority information 724 to the resource management server 10 (step S460).

According to the present embodiment, the user is capable of determining active resources in consideration of priorities determined by the resource management system based on usage history information in addition to user specified priorities. Furthermore, the resource management server is capable of determining resource states in consideration of user priorities and system priorities.

5. Fifth Embodiment

Next, a fifth embodiment will be described. The fifth embodiment is an embodiment in which the processing executed by the priority management server 70 in the third embodiment is executed by the resource management server 14. The present embodiment replaces FIG. 22 of the third embodiment with FIG. 30, and FIG. 26 with FIG. 31. In addition, the same reference numerals are given to the same functional units and processing, and the description will be omitted.

The resource management system of the present embodiment is a system in which the resource management server 12 included in the system 2 is replaced by the resource management server 14, and the priority management server 70 is removed.

Figure 30:
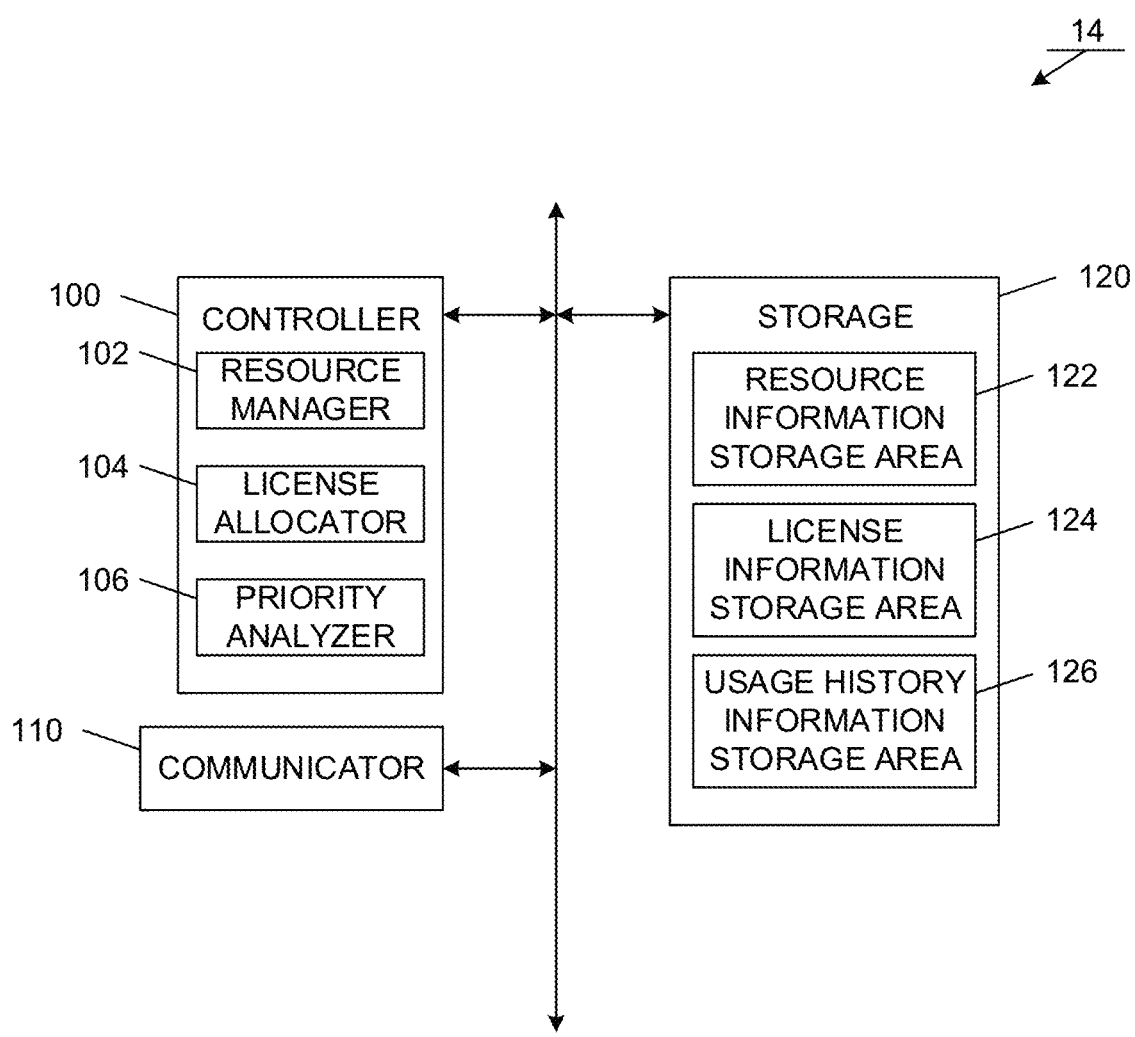
FIG. 30 is a functional block diagram for describing a functional configuration of a resource management server according to a fifth embodiment.

The functional configuration of the resource management server 14 will be described with reference to FIG. 30. Unlike the resource management server 12, the resource management server 14 includes a license allocator 104 and a priority analyzer 106. Furthermore, it differs in that a usage history information storage area 126 is provided in the storage 120.

In the present embodiment, the usage history information is stored by the resource management server 14. Therefore, the conference support app 442 transmits the usage history information to the resource management server 14.

Figure 31:
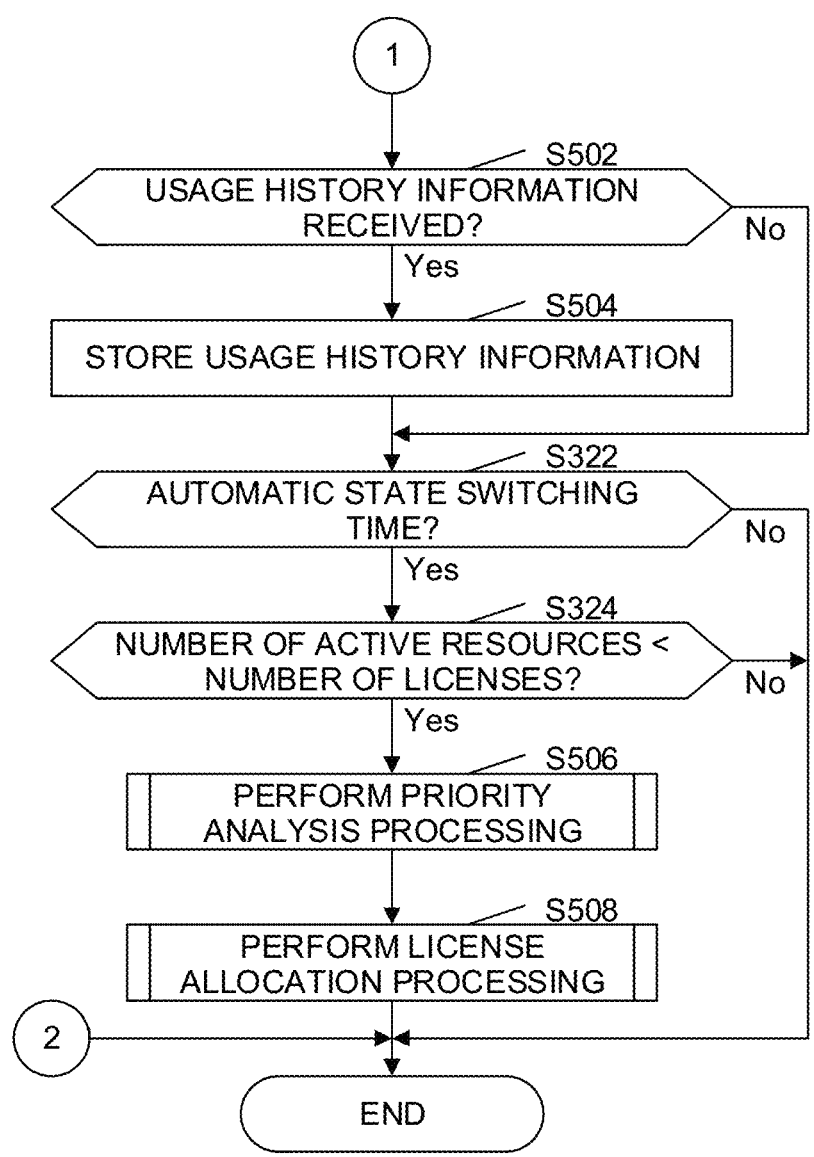
FIG. 31 is a flow diagram for describing the flow of main processing in the resource management server according to the fifth embodiment.

Next, the main processing in the resource management server 14 of the present embodiment will be described with reference to FIG. 31. In the present embodiment, the processing performed when the user performs a management screen display operation is the same as FIG. 25 of the third embodiment. FIG. 31 describes the processing performed when a management screen display operation is not performed (when the determination result of step S302 is No).

When a management screen display operation is not performed, the controller 100 determines whether or not usage history information has been received from the conference terminal device 40 (step S502). If usage history information has been received, the received usage history information is stored in the usage history information storage area 126 (step S502; Yes→step S504).

Then, if it is currently an automatic state switching time and the number of active resources is less than the number of licenses, the priority analyzer 106 executes priority analysis processing (step S322; Yes→step S324; Yes→step S506). The priority analysis processing is the same processing as step S358 of the third embodiment. Then, after determining the priority of each resource, the priority analyzer 106 reads the resource information corresponding to each resource from the resource information storage area 122, and stores the determined priorities in the resource information.

Next, the license allocator 104 executes license allocation processing (step S508). As a result, the resource management server 14 determines the priorities based on the usage history information, and is capable of activating resources equivalent to the number of licenses from the determined priorities.

Like the third embodiment, the priority analyzer 106 may always activate the resources activated by the user irrespective of the usage history information, and the priorities may be determined by a method that more readily reflects the priorities set by the user.

According to the present embodiment, the resource management server is capable of activating resources equivalent to the number of licenses based on the usage history information.

6. Sixth Embodiment

Next, a sixth embodiment will be described. The sixth embodiment is an embodiment in which the processing executed by the priority management server 72 in the fourth embodiment is executed by the resource management server 14. The present embodiment replaces FIG. 28 of the fourth embodiment with FIG. 32. In addition, the same reference numerals are given to the same functional units and processing, and the description will be omitted.

The resource management system of the present embodiment is a system in which the resource management server 12 included in the system 2 is replaced by the resource management server 14, and the priority management server 70 is removed. Furthermore, in the present embodiment, the usage history information is stored by the resource management server 14. Therefore, the conference support app 442 transmits the usage history information to the resource management server 14.

Moreover, in the resource management server 14 of the present embodiment, the resource information stored in the resource information storage area 122 further stores a system priority and a user priority in addition to the resource ID, attributes, and the resource state. The system priority is a priority determined by the priority analyzer 106 of the resource management server 14. The user priority is a priority determined by a user operation.

Figure 32:
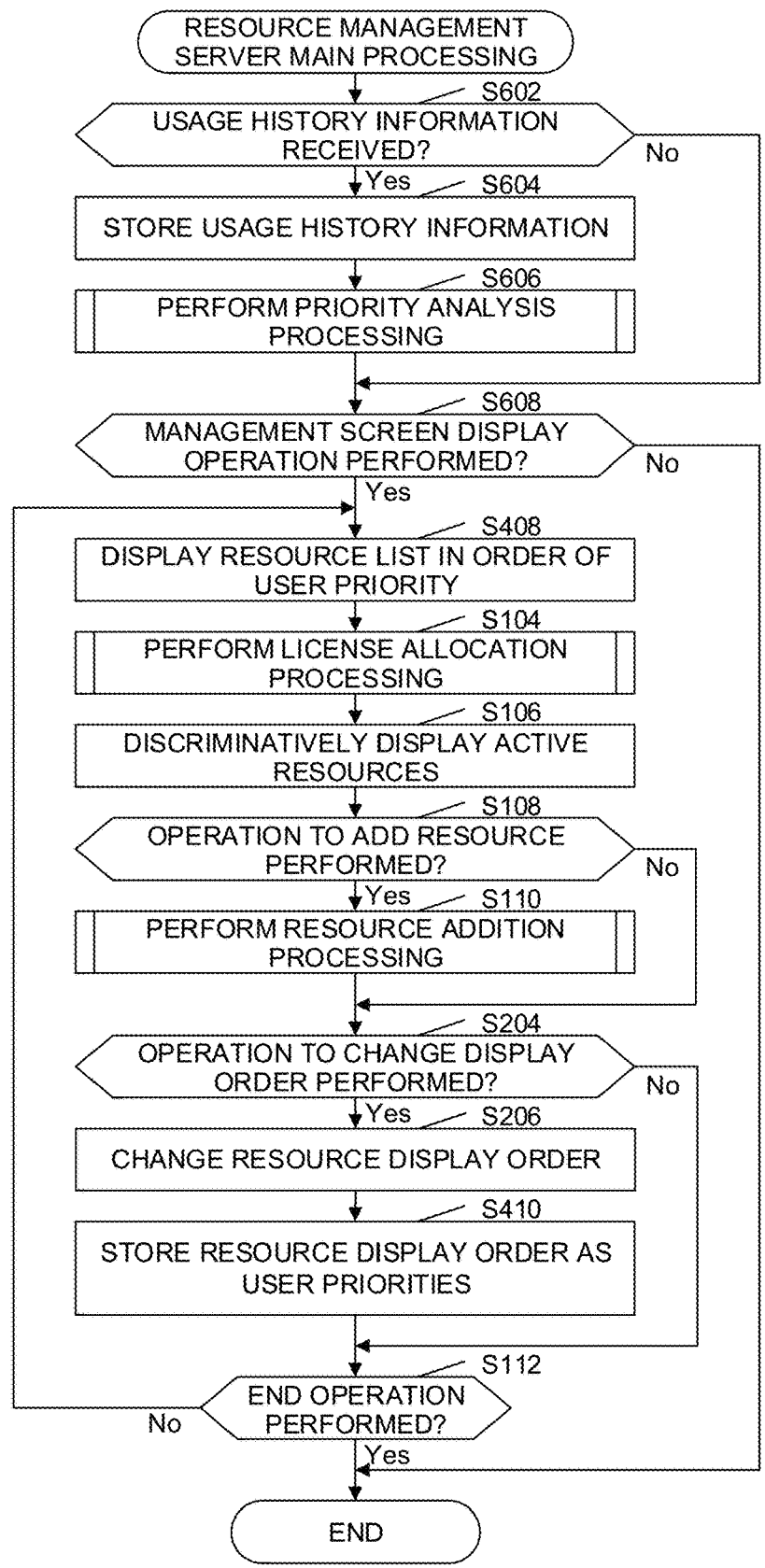
FIG. 32 is a flow diagram for describing the flow of main processing in a resource management server according to a sixth embodiment.

The main processing performed by the resource management server 14 of the present embodiment will be described with reference to FIG. 32. First, if the controller 100 receives usage history information from the conference terminal device 40, it stores the usage history information in the usage history information storage area 126 (step S602; Yes→step S604). Then, the priority analyzer 106 executes priority analysis processing (step S606). The priority analysis processing is the same processing as step S358 of the third embodiment. Then, after determining the priority of each resource, the priority analyzer 106 reads the resource information corresponding to each resource from the resource information storage area 122, and stores the determined priorities as system priorities.

Then, the controller 100 determines whether or not a management screen display operation has been performed (step S608). If a management screen display operation has been performed, the processing from step S408 to step S112 of the fourth embodiment is executed.

According to the present embodiment, the resource management server is capable of determining priorities based on the usage history information.

7. Seventh Embodiment

Next, a seventh embodiment will be described. The seventh embodiment is an embodiment in which licenses are allocated according to a predetermined rule when the resource management server acquires a plurality of license information. The present embodiment is also applicable to the first embodiment to the sixth embodiment described above. However, a case where it is applied to the first embodiment will be described below. The present embodiment is an embodiment in which FIG. 3 of the first embodiment is replaced with FIG. 33, and FIG. 9 with FIG. 34. In addition, the same reference numerals are given to the same functional units and processing, and the description will be omitted.

The resource information stored in the resource information storage area 122 in the present embodiment will be described with reference to FIG. 33. FIG. 33 is a diagram showing an example of the resource information of the present embodiment. The resource information of the present embodiment stores, for example, a resource ID, attributes (the conference room name, the location of the conference room, and the device installed in the conference room), and a license ID for identifying the allocated license (for example, "L1").

A resource which has a stored license ID has an allocated license which is identified by the license ID, which indicates that the resource is active. On the other hand, a resource which does not have a stored license ID does not have an allocated license, which indicates that the resource is inactive.

Figure 34:
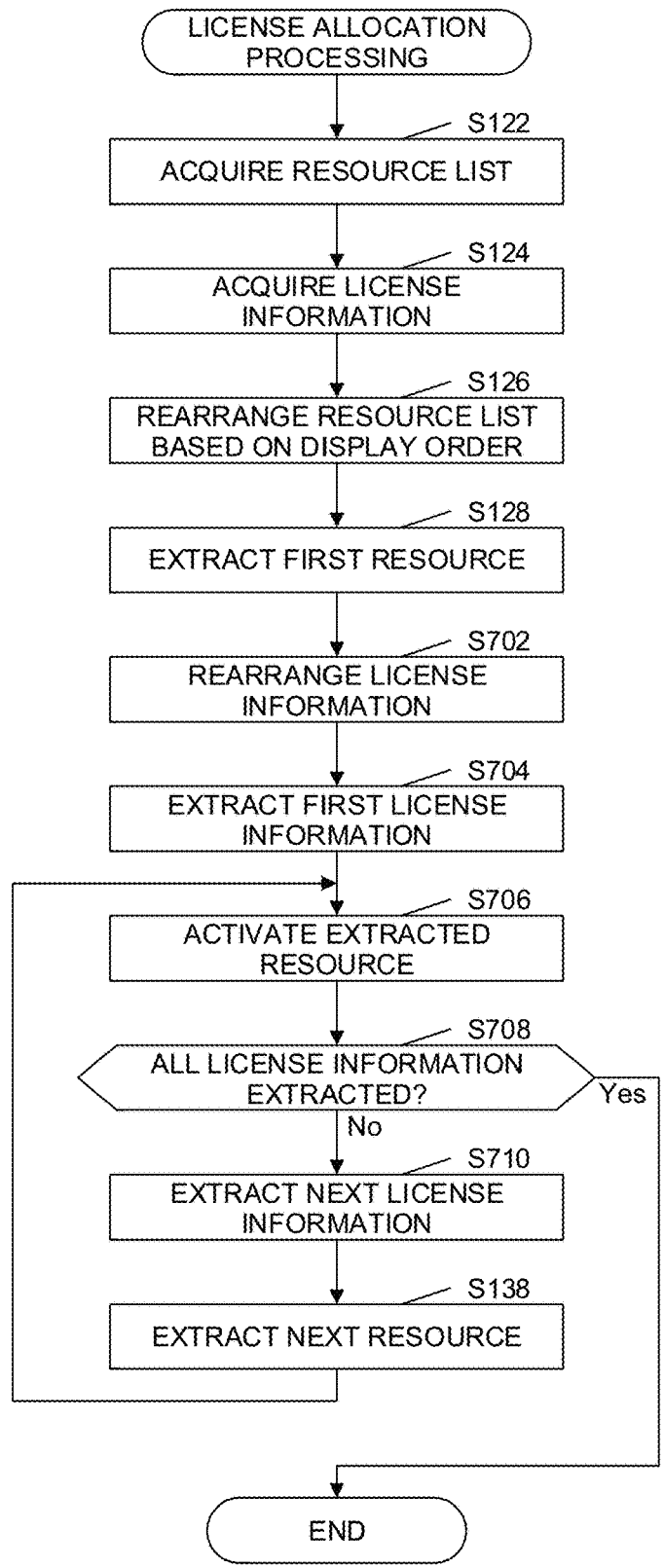
FIG. 34 is a flow diagram for describing the flow of license allocation processing according to the seventh embodiment.

The license allocation processing executed by the license allocator 104 will be described with reference to FIG. 34. In the present embodiment, the description assumes that the license information storage area 124 stores a plurality license information as shown in FIG. 4A.

In the present embodiment, when the license allocator 104 extracts the first resource (step S128), the plurality of license information is rearranged according to a predetermined rule (step S702). The predetermined rule may, for example, order the license information in order from the longest period until the expiration date. The predetermined rule may also order the license information in order from the shortest period until the expiration date. Furthermore, when purchase date information is stored in the license information, the license information may be ordered in order from the earliest license purchase date, or in order of the license ID.

Then, the license allocator 104 acquires the first license information from the rearranged license information (step S704), and activates the resource by allocating a license to the extracted resource (step S706). For example, the license allocator 104 reads the resource information relating to the resource extracted in step S128 from the resource information storage area 122. Then, the license allocator 104 stores, as the license ID of the read resource information, the license ID stored in the license information extracted in step S704.

Then, the license allocator 104 determines whether or not all of the license information stored in the license information storage area 124 has been extracted (step S708). If all of the license information has been extracted, the license allocator 104 ends the license allocation processing (step S708; Yes). If all of the license information has not been extracted, the license allocator 104 extracts the next set of license information from the license information that was rearranged in step S702 (step S708; No→step S710). Furthermore, the license allocator 104 extracts the next resource from the resource list that was rearranged in step S126 (step S138).

Then, returning to step S706, the license allocator 104 allocates, with respect to the resource extracted in step S138, a license to the resource extracted based on the license information extracted in step S710, thereby activating the resource.

In the processing described above, the license allocator 104 is capable of allocating a plurality of licenses to resources that have been rearranged based on the display order according to a predetermined rule.

Furthermore, the license allocator 104 may allocate licenses to resources according to an attribute stored in the license information. For example, if the number and type of usable devices is stored in the license information, the license allocator 104 may allocate the licenses from the highest priority resource so that the number of usable devices increases. As a result, the license allocator 104 is capable of preferentially allocating the licenses according to the priorities of the resources in a manner which is suitable for the resources.

Furthermore, in the description above, a case was described in which a plurality of resource information is stored in the resource management server 10 described in the first embodiment. However, the description is also applicable to cases where a plurality of resource information is stored in the second embodiment to the sixth embodiment. In these cases, the license allocator 104 or the license allocator 702 allocate licenses according to a predetermined rule from the highest priority resource.

According to the present embodiment, even when a plurality of licenses is being managed, the license management server allocates licenses to the resources according to a predetermined rule. Therefore, when a plurality of licenses is being managed, the user is able to reduce the effort associated with reallocating the licenses when a license expires on the expiration date. Furthermore, by allocating the licenses according to the attributes of the resources rather than simply activating resources equivalent to the number of licenses, the user is able to avoid incurring excessive costs and the like.

8. Modifications

The present invention is not limited to the embodiments described above, and various changes may be made. That is to say, embodiments obtained by combining technical means appropriately changed without departing from the scope of the present invention are also included in the technical scope of the present invention.

Further, the resource management server of the present invention may be arranged in the cloud. As a result, the functions realized by the resource management server of the present invention can be provided as a service.

Furthermore, the embodiments described above have portions described separately for convenience of description. It is needless to say that they may be combined within a technically possible range.

Furthermore, in the embodiments, the program that operates in each device is a program that controls a CPU or the like (a program that causes a computer to function) so as to realize the functions of the embodiments described above. Further, the information handled by these devices is temporarily stored in a temporary storage device (such as a RAM) at the time of processing, and subsequently stored in storage devices such as various read only memory (ROMS) and HDDs. Then, the information is read, corrected, and written as necessary by the CPU.

Here, the recording medium that stores the program may be any of a semiconductor medium (such as a ROM or a non-volatile memory card), an optical recording medium or magneto-optical recording medium (such as a digital versatile disc (DVD), an magneto-optical disc (MO), a MiniDisc (MD), a compact disc (CD), or a Blu-ray disc (BD, registered trademark), a magnetic recording medium (such as a magnetic tape or a flexible disk), and the like. Furthermore, in addition to reading and executing the program to realize the functions of the embodiments described above, the functions of the present invention can sometimes be realized by joint processing between an operating system or other application programs based on the instructions from the program.

When distributed in the market, the program can be stored and distributed in a portable recording medium, or transferred to a server computer connected via a network such as the Internet. In this case, it is needless to say that the storage device of the server computer is included in the present invention.

BRIEF DESCRIPTION OF THE REFERENCE SYMBOLS 1, 2 System
10, 12, 14 Resource management server
100 Controller
102 Resource manager
104 License allocator
106 Priority analyzer
110 Communicator
120 Storage
122 Resource information storage area
124 License information storage area
126 Usage history information storage area
20 License management server
200 Controller
202 License manager
210 Communicator
220 Storage
222 License information storage area
30 Management terminal device
300 Controller
310 Communicator
320 Display unit
330 Operation input unit
340 Storage
40 Conference terminal device
400 Controller
410 Communicator
420 Display unit
430 Operation input unit
440 Storage
442 Conference support app
50 Display device
60 Conference management server
70, 72 Priority management server
700 Controller
702 License allocator
704 Priority analyzer
710 Communicator
720 Storage
722 Usage history information storage area
724 Priority information
726 License information storage area
728 Resource state information

What is claimed is:

1. A resource management server comprising:
a controller;
a communicator that communicates with a license management server which manages a license; and
a storage, wherein
the storage stores resource information, and
the controller:
acquires license information from the license management server via the communicator; and
activates resources stored by the storage, starting from a highest priority resource, based on the license information.

2. The resource management server according to claim 1, wherein
the controller:
acquires a number of licenses based on the license information; and
activates the resources in descending order of priority according to the number of licenses acquired.

3. The resource management server according to claim 2, wherein
the controller counts a number of sets of license information to acquire the number of licenses.

4. The resource management server according to claim 2, wherein
the license information contains the number of licenses, and
the controller reads the license information to acquire the number of licenses.

5. The resource management server according to claim 1, wherein
the controller performs control to list and display the resources, which are stored, in descending order of priority.

6. The resource management server according to claim 5, wherein
the controller:
changes a display order of the resources listed and displayed, based on an operation for changing the display order when the operation is performed; and
determines a priority of the resources based on the display order changed.

7. The resource management server according to claim 1, further comprising a usage history storage that stores a usage history of the resources, wherein
the controller determines a priority of the resources based on the usage history.

8. The resource management server according to claim 1, further comprising a usage history storage that stores a usage history of the resources, wherein
the controller activates the resources according to the license based on the usage history.

9. The resource management server according to claim 8, wherein when a user specifies a resource to be activated, the controller activates the resource specified, irrespective of the usage history.

10. The resource management server according to claim 1, wherein the resources include a conference room.

11. A control method for a resource management server including a controller, a communicator that communicates with a license management server which manages a license, and a storage that stores resource information, the control method comprising:

acquiring license information from the license management server via the communicator; and activating resources stored by the storage, starting from a highest priority resource, based on the license information.

12. A non-transitory storage medium storing a program that is readable by a computer of a resource management server including a controller, a communicator that communicates with a license management server which manages a license, and a storage that stores resource information, wherein the program causes the computer to:

acquire license information from the license management server via the communicator; and activate resources stored by the storage, starting from a highest priority resource, based on the license information.

* * * * *